US010218737B2

(12) United States Patent
Bailey, Jr.

(10) Patent No.: US 10,218,737 B2
(45) Date of Patent: *Feb. 26, 2019

(54) TRUSTED MEDIATOR INTERACTIONS WITH MOBILE DEVICE SENSOR DATA

(71) Applicant: American Express Travel Related Services Company, Inc., New York, NY (US)

(72) Inventor: Samuel A. Bailey, Jr., Boca Raton, FL (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/949,980

(22) Filed: Apr. 10, 2018

(65) Prior Publication Data
US 2018/0234451 A1 Aug. 16, 2018

Related U.S. Application Data

(63) Continuation of application No. 15/629,492, filed on Jun. 21, 2017, now Pat. No. 9,973,526, which is a (Continued)

(51) Int. Cl.
G06F 11/30 (2006.01)
G06F 12/14 (2006.01)
(Continued)

(52) U.S. Cl.
CPC ........ H04L 63/1433 (2013.01); G06F 21/554 (2013.01); G06F 21/577 (2013.01);
(Continued)

(58) Field of Classification Search
CPC . H04L 63/14; H04L 63/1408; H04L 63/1425; H04L 63/1433; H04L 2463/102; G06Q 20/382; G06Q 10/0635
See application file for complete search history.

(56) References Cited

U.S. PATENT DOCUMENTS 4,796,025 A * 1/1989 Farley .................. H04Q 9/14
340/3.4
5,053,956 A 10/1991 Donald et al.
(Continued)

FOREIGN PATENT DOCUMENTS

CN 1269030 10/2000
CN 101189859 5/2008
(Continued)

OTHER PUBLICATIONS

Office Action dated Jun. 1, 2017 in Chinese Application No. 201510029327.6.
(Continued)

Primary Examiner — Zachary A. Davis
(74) Attorney, Agent, or Firm — Snell & Wilmer, L.L.P.

(57) ABSTRACT

A system, method, and computer-readable medium for reporting sensor data over a communication network are provided. A data reporting instruction that identifies at least one of a sensor or a data reporting technique is received from a trust mediator over a communication network. The data reporting instruction is based at least in part on an identified risk. Sensor data is obtained from the sensor, and the sensor data is transmitted to the trust mediator over the communication network based on the data reporting technique.

19 Claims, 5 Drawing Sheets

Related U.S. Application Data continuation of application No. 14/599,151, filed on Jan. 16, 2015, now Pat. No. 9,712,552, which is a continuation of application No. 14/139,840, filed on Dec. 23, 2013, now Pat. No. 8,955,140, which is a continuation of application No. 12/640,183, filed on Dec. 17, 2009, now Pat. No. 8,621,636.

(51) Int. Cl.
| | |
|---|---|
| *H04L 29/06* | (2006.01) |
| *H04W 12/06* | (2009.01) |
| *H04L 29/08* | (2006.01) |
| *G06F 21/55* | (2013.01) |
| *G06F 21/57* | (2013.01) |

(52) U.S. Cl.
CPC ........ *H04L 63/0861* (2013.01); *H04L 63/107* (2013.01); *H04L 63/1408* (2013.01); *H04L 67/12* (2013.01); *H04L 67/2842* (2013.01); *H04W 12/06* (2013.01); *G06F 2221/034* (2013.01); *H04L 2463/102* (2013.01)

(56) References Cited

U.S. PATENT DOCUMENTS

| | | | |
|---|---|---|---|
| 5,784,566 A | 7/1998 | Viavant et al. | |
| 5,796,942 A | 8/1998 | Esbensen | |
| 6,088,450 A | 7/2000 | Davis et al. | |
| 6,321,338 B1 * | 11/2001 | Porras | H04L 41/142 |
| | | | 709/224 |
| 6,330,546 B1 | 12/2001 | Gopinathan et al. | |
| 6,484,182 B1 | 11/2002 | Dunphy et al. | |
| 6,530,024 B1 | 3/2003 | Proctor | |
| 6,590,580 B2 | 7/2003 | Horikawa et al. | |
| 6,611,863 B1 | 8/2003 | Banginwar | |
| 6,681,249 B2 * | 1/2004 | Christensen | G06F 11/3447 |
| | | | 709/223 |
| 6,744,780 B1 | 6/2004 | Gu et al. | |
| 6,961,858 B2 | 11/2005 | Fransdonk | |
| 6,965,294 B1 * | 11/2005 | Elliott | G07C 9/00896 |
| | | | 235/382 |
| 7,020,635 B2 | 3/2006 | Hamilton et al. | |
| 7,058,968 B2 | 6/2006 | Rowland et al. | |
| 7,080,049 B2 | 7/2006 | Truitt et al. | |
| 7,090,128 B2 | 8/2006 | Farley et al. | |
| 7,095,850 B1 | 8/2006 | McGrew | |
| 7,107,462 B2 | 9/2006 | Fransdonk | |
| 7,150,045 B2 | 12/2006 | Koelle et al. | |
| 7,152,242 B2 * | 12/2006 | Douglas | G06F 21/552 |
| | | | 726/23 |
| 7,174,462 B2 | 2/2007 | Pering et al. | |
| 7,260,844 B1 * | 8/2007 | Tidwell | G06F 21/577 |
| | | | 726/22 |
| 7,305,709 B1 | 12/2007 | Lymer et al. | |
| 7,565,693 B2 | 7/2009 | Shin et al. | |
| 7,587,502 B2 | 9/2009 | Crawford et al. | |
| 7,620,606 B2 | 11/2009 | Gentry et al. | |
| 7,660,795 B2 | 2/2010 | Barrett et al. | |
| 7,685,254 B2 | 3/2010 | Pandya | |
| 7,711,586 B2 | 5/2010 | Aggarwal et al. | |
| 7,835,721 B2 | 11/2010 | Tuulos et al. | |
| 7,895,649 B1 | 2/2011 | Brook et al. | |
| 7,921,205 B2 * | 4/2011 | Shen | G06F 11/3495 |
| | | | 370/352 |
| 7,937,353 B2 | 5/2011 | Bernoth et al. | |
| 8,001,054 B1 | 8/2011 | Peart et al. | |
| 8,074,282 B1 | 12/2011 | Lymer et al. | |
| 8,087,085 B2 | 12/2011 | Hu et al. | |
| 8,117,458 B2 | 2/2012 | Osborn, III et al. | |
| 8,146,160 B2 | 3/2012 | Orr et al. | |
| 8,272,061 B1 | 9/2012 | Lotem et al. | |
| 8,406,119 B2 * | 3/2013 | Taylor | G03G 15/5075 |
| | | | 370/216 |
| 8,621,636 B2 | 12/2013 | Bailey | |
| 8,639,629 B1 | 1/2014 | Hoffman | |
| 8,650,129 B2 | 2/2014 | Bailey | |
| 8,752,142 B2 | 6/2014 | Bailey | |
| 8,850,539 B2 | 9/2014 | Bailey | |
| 8,924,296 B2 | 12/2014 | Bailey | |
| 8,955,140 B2 | 2/2015 | Bailey | |
| 8,959,568 B2 | 2/2015 | Hudis et al. | |
| 9,027,120 B1 * | 5/2015 | Tidwell | G06F 21/606 |
| | | | 713/154 |
| 9,213,975 B2 | 12/2015 | Bailey | |
| 9,292,695 B1 | 3/2016 | Bassett | |
| 9,712,552 B2 * | 7/2017 | Bailey, Jr. | H04L 63/0861 |
| 9,973,526 B2 * | 5/2018 | Bailey, Jr. | H04L 63/0861 |
| 10,032,224 B2 * | 7/2018 | Helitzer | G06Q 40/08 |
| 2002/0129145 A1 * | 9/2002 | Chow | H04L 29/06 |
| | | | 709/225 |
| 2002/0194096 A1 | 12/2002 | Falcone et al. | |
| 2002/0194119 A1 | 12/2002 | Wright et al. | |
| 2003/0076959 A1 | 4/2003 | Chui et al. | |
| 2003/0110392 A1 * | 6/2003 | Aucsmith | H04L 41/28 |
| | | | 726/25 |
| 2003/0145226 A1 | 7/2003 | Bruton, III et al. | |
| 2003/0223584 A1 | 12/2003 | Bradley | |
| 2004/0015719 A1 | 1/2004 | Lee et al. | |
| 2004/0030927 A1 | 2/2004 | Zuk | |
| 2004/0049698 A1 | 3/2004 | Ott et al. | |
| 2004/0187034 A1 | 9/2004 | Tamura et al. | |
| 2005/0010768 A1 | 1/2005 | Light et al. | |
| 2005/0091527 A1 | 4/2005 | Swander et al. | |
| 2005/0125360 A1 | 6/2005 | Tidwell et al. | |
| 2005/0164675 A1 | 7/2005 | Tuulos et al. | |
| 2005/0182969 A1 | 8/2005 | Ginter et al. | |
| 2005/0201561 A1 | 9/2005 | Komano et al. | |
| 2006/0085839 A1 | 4/2006 | Brandt et al. | |
| 2006/0090198 A1 | 4/2006 | Aaron | |
| 2006/0094400 A1 | 5/2006 | Beachem et al. | |
| 2006/0161435 A1 | 7/2006 | Atef et al. | |
| 2006/0200427 A1 | 9/2006 | Morrison et al. | |
| 2006/0200666 A1 | 9/2006 | Bailey, Jr. | |
| 2006/0225132 A1 | 10/2006 | Swift et al. | |
| 2006/0265739 A1 | 11/2006 | Bhaskaran et al. | |
| 2006/0276173 A1 | 12/2006 | Srey et al. | |
| 2006/0291447 A1 | 12/2006 | Siliquini et al. | |
| 2007/0016955 A1 | 1/2007 | Goldberg et al. | |
| 2007/0036314 A1 | 2/2007 | Kloberdans et al. | |
| 2007/0101432 A1 | 5/2007 | Carpenter | |
| 2007/0143832 A1 | 6/2007 | Perrella et al. | |
| 2007/0234412 A1 * | 10/2007 | Smith | G06F 21/53 |
| | | | 726/11 |
| 2007/0250709 A1 | 10/2007 | Bailey, Jr. | |
| 2008/0082380 A1 | 4/2008 | Stephenson | |
| 2008/0086759 A1 | 4/2008 | Colson | |
| 2008/0096529 A1 | 4/2008 | Zellner | |
| 2008/0098464 A1 | 4/2008 | Mizrah | |
| 2008/0104700 A1 | 5/2008 | Fagone et al. | |
| 2008/0107090 A1 | 5/2008 | Thomson et al. | |
| 2008/0120707 A1 | 5/2008 | Ramia | |
| 2008/0178294 A1 | 7/2008 | Hu et al. | |
| 2008/0243439 A1 | 10/2008 | Runkle | |
| 2008/0262990 A1 | 10/2008 | Kapoor et al. | |
| 2008/0270579 A1 * | 10/2008 | Herz | G06F 17/30867 |
| | | | 709/219 |
| 2008/0307487 A1 | 12/2008 | Choyi et al. | |
| 2009/0025084 A1 | 1/2009 | Siourthas et al. | |
| 2009/0044279 A1 | 2/2009 | Crawford et al. | |
| 2009/0112767 A1 | 4/2009 | Hammad | |
| 2009/0125977 A1 | 5/2009 | Chander et al. | |
| 2009/0156180 A1 | 6/2009 | Slavin | |
| 2009/0158425 A1 | 6/2009 | Chan et al. | |
| 2009/0165125 A1 | 6/2009 | Brown et al. | |
| 2009/0216910 A1 | 8/2009 | Duchesneau | |
| 2009/0222907 A1 * | 9/2009 | Guichard | G06F 21/6227 |
| | | | 726/17 |
| 2009/0271844 A1 | 10/2009 | Zhang et al. | |
| 2009/0292568 A1 | 11/2009 | Khosravani et al. | |
| 2009/0300716 A1 | 12/2009 | Ahn | |
| 2009/0328219 A1 | 12/2009 | Narayanswamy | |
| 2010/0010874 A1 | 1/2010 | Howard et al. | |

(56) References Cited

U.S. PATENT DOCUMENTS

| | | |
|---|---|---|
| 2010/0082513 A1 | 4/2010 | Liu |
| 2010/0094767 A1 | 4/2010 | Miltonberger |
| 2010/0251388 A1 | 9/2010 | Dorfman |
| 2010/0275010 A1 | 10/2010 | Ghirardi |
| 2010/0280950 A1 | 11/2010 | Faith |
| 2010/0293090 A1 | 11/2010 | Domenickos et al. |
| 2010/0294927 A1 | 11/2010 | Nelson et al. |
| 2011/0016513 A1 | 1/2011 | Bailey |
| 2011/0154034 A1 | 6/2011 | Bailey |
| 2011/0154497 A1 | 6/2011 | Bailey |
| 2011/0178933 A1 | 7/2011 | Bailey |
| 2011/0252479 A1 | 10/2011 | Beresnevichiene et al. |
| 2011/0313925 A1 | 12/2011 | Bailey |
| 2011/0313930 A1 | 12/2011 | Bailey |
| 2011/0314529 A1 | 12/2011 | Bailey |
| 2014/0156515 A1 | 6/2014 | Bailey |
| 2014/0379581 A1 | 12/2014 | Bailey |
| 2015/0012979 A1 | 1/2015 | Bailey |
| 2015/0161611 A1 | 6/2015 | Duke |
| 2016/0057129 A1 | 2/2016 | Bailey |
| 2017/0187744 A1 | 6/2017 | Bailey |

FOREIGN PATENT DOCUMENTS

| | | |
|---|---|---|
| CN | 101300566 | 11/2008 |
| CN | 101438251 | 5/2009 |
| GB | 2456742 | 7/2009 |
| JP | 2004078539 | 3/2004 |
| JP | 2004280724 | 10/2004 |
| JP | 2009110334 | 5/2009 |
| JP | 2009523275 | 6/2009 |
| JP | 2011517859 | 6/2011 |
| WO | 2009021070 | 2/2009 |

OTHER PUBLICATIONS

Advisory Action dated Jun. 12, 2017 in U.S. Appl. No. 14/480,169.
Office Action dated Jun. 16, 2017 in U.S. Appl. No. 14/933,165.
Office Action dated Sep. 21, 2017 in U.S. Appl. No. 12/820,190.
Office Action dated Dec. 4, 2017 in U.S. Appl. No. 14/480,169.
Notice of Allowance dated Oct. 19, 2017 in U.S. Appl. No. 15/456,252.
Notice of Allowance dated Oct. 19, 2017 in U.S. Appl. No. 14/933,165.
Office Action dated Jan. 4, 2018 in U.S. Appl. No. 15/819,166.
Office Action dated Oct. 6, 2017 in U.S. Appl. No. 15/629,492.
Notice of Allowance dated Feb. 9, 2018 in U.S. Appl. No. 15/629,492.
Corrected Notice of Allowability dated May 8, 2014 in U.S. Appl. No. 12/504,828.
Notice of Allowance dated May 22, 2014 in U.S. Appl. No. 12/820,193.
Office Action dated Oct. 7, 2014 in U.S. Appl. No. 14/139,840.
Office Action dated Jan. 9, 2015 in U.S. Appl. No. 14/480,169.
Final Office Action dated Apr. 23, 2015 in U.S. Appl. No. 14/480,169.
Office Action dated Apr. 29, 2015 in U.S. Appl. No. 14/492,771.
Office Action dated Jun. 4, 2015 in Canadian Application No. 2,767,862.
Advisory Action dated Aug. 5, 2015 in U.S. Appl. No. 14/480,169.
Notice of Allowance dated Aug. 12, 2015 in U.S. Appl. No. 14/492,771.
Office Action dated Nov. 2, 2015 in U.S. Appl. No. 14/252,276.
Office Action dated Feb. 1, 2016 in U.S. Appl. No. 14/480,169.
Office Action dated Feb. 22, 2016 in U.S. Appl. No. 12/640,289.
Notice of Allowance dated Feb. 24, 2016 in U.S. Appl. No. 14/252,276.
Office Action dated Apr. 7, 2016 in U.S. Appl. No. 12/820,190.
Notice of Allowance dated May 27, 2016 in Canadian Application No. 2,767,862.
Office Action dated Jun. 15, 2016 in U.S. Appl. No. 14/599,151.
Office Action dated Jun. 16, 2016 in U.S. Appl. No. 14/175,475.
Final Office Action dated Jul. 14, 2016 in U.S. Appl. No. 12/640,289.
Extended European Search Report dated Jul. 22, 2016 in European Application No. 10800510.9.
Advisory Action dated Sep. 23, 2016 in U.S. Appl. No. 12/640,289.
Final Office Action dated Sep. 29, 2016 in U.S. Appl. No. 14/599,151.
Notice of Allowance dated Oct. 13, 2016 in U.S. Appl. No. 14/175,475.
Final Office Action dated Nov. 3, 2016 in U.S. Appl. No. 12/820,190.
Wrixon, "Codes Ciphers & Other Cryptic and Calndestine Sommunications, Making and Breaking Secret Messages from Hieroglyphs to the Internet," Black DogLrvrnthal Pub, (1998), pp. 298-309.
Aissi et al., ""Security for Mobile Networks and Platforms"", Artech HousePublishers (2006), 329 pages.
Chen, "Java Card Technology for Smart Cards: Architecture and Programmers Guide", Prentice Hall (2000), pp. 57-63.
Christensen and Raynor, "The Innovators Solution: Creating and Sustaining Successful Growth" Harvard Business Press (2003), pp. 31-71.
Dowling, "Mathematical Methods for Business and Economics", McGraw-Hill (2009), pp. 89-127 and 177-196.
Gibbons, "Game Theory for Applied Economists", Princeton University Press (1992), pp. 29-48 and 173-255.
Hill and Jones, "Strategic Management Theory: AnIntegrated Approach", South-Western College Pub, 9th edition (2009), pp. 208-241.
Howard and Leblanc, "Writing Secure Code, Practical Strategies and Techniques for Secure Application Coding in a Networked World", Microsoft Press, 2nd ed. (2003), pp. 69-124, 259-298, and 455-476.
Krutz and Vines, "The CISSP Prep Guide, Mastering the Ten Domains of Computer Security", Wiley (2001), paaes 183-213.
Morris, "Introduction to Game Theory", Springer Verlag New York, Inc. (1994), pa a es 65-97.
Schwartau, "Time Based Security", Interpact Press (1999), pp. 33-36, 65-74, and 121-125.
Shah, "Hacking Web Services", Charles River Media (2006), pp. 171-221, 271-298.
English et al., "Dynamic Trust Models for Ubiquitous Computing Environments", University of Strathclyde, Glasgow, Scotland, Department of Computer and InformationSciences (2002).
Messick, "Cyber War: Sabotaging the System" (Nov. 8, 2009), CBS Interactive Inc., http://www.cbsnews.com/stories/2009/11/06/60minutes/main5555565.shtml?tag=currentVideoInfo;seamentUtilities.
Ning and Jajodia, "Intrusion Detection Techniques", http://discovery.csc.ncsu.edu/Courses/csc774-S03/IDTechniques.pdf (last visited Sep. 24, 2010).
Wotring, ""Host Integrity Monitoring: Best Practices for Deployment"" (Mar. 31, 2004),http://www.symantec.com/connect/articles/host-integrity-monitoring-best-practicesdeployment.
Office Action dated Nov. 14, 2016 in U.S. Appl. No. 12/640,289.
Advisory Action dated Dec. 27, 2016 in U.S. Appl. No. 14/599,151.
Advisory Action dated Jan. 11, 2017 in U.S. Appl. No. 12/820,190.
Office Action dated Jan. 17, 2017 in U.S. Appl. No. 14/599,151.
Notice of Allowance dated Feb. 23, 2017 in U.S. Appl. No. 15/166,673.
U.S. Appl. No. 15/337,246, filed Oct. 28, 2016 entitled "Selectable Encryption Methods".
Final Office Action dated Mar. 20, 2017 in U.S. Appl. No. 14/480,169.
Final Office Action dated Mar. 29, 2017 in U.S. Appl. No. 12/640,289.
Notice of Allowance dated May 9, 2017 in U.S. Appl. No. 14/599,151.
Paquet, "Network Security Concepts and Policies," Sample chaper is provided courtes of Cisco Press, Feb. 5, 2013, 29 pages, http://ciscopress.com/articles/article/asp?p=1998559, retrieved online Jun. 17, 2017.
Notice of Allowance dated Jun. 28, 2017 in U.S. Appl. No. 12/640,289.
International Search Report and Written Opinion dated Nov. 15, 2010 in Application No. PCT/US2010/042043.
International Search Report and Written Opinion dated Feb. 2, 2011 in Application No. PCT/US2010/059883.
International Search Report and Written Opinion dated Feb. 2, 2011 in Application No. PCT/US2010/059887.
International Search Report and Written Opinion dated Feb. 11, 2011 in Application No. PCT/US2010/059889.

(56) References Cited

OTHER PUBLICATIONS

Office Action dated Aug. 5, 2011 in U.S. Appl. No. 12/820,190.
Office Action dated Aug. 5, 2011 in U.S. Appl. No. 12/640,289.
International Search Report and Written Opinion dated Nov. 14, 2011 in Application No. PCT/US2011/041147.
Office Action dated Dec. 9, 2011 in U.S. Appl. No. 12/820,186.
International Preliminary Report on Patentability dated Jan. 17, 2012 in Application No. PCT/US2010/042043.
Final Office Action dated Jan. 19, 2012 in U.S. Appl. No. 12/640,289.
Office Action dated Jan. 20, 2012 in U.S. Appl. No. 12/504,828.
Final Office Action dated Feb. 10, 2012 in U.S. Appl. No. 12/820,190.
Final Office Action dated Mar. 29, 2012 in U.S. Appl. No. 12/820,186.
Office Action dated Mar. 30, 2012 in U.S. Appl. No. 12/640,183.
Advisory Action dated May 9, 2012 in U.S. Appl. No. 12/640,289.
Advisory Acton dated Jun. 6, 2012 in U.S. Appl. No. 12/820,190.
International Preliminary Report on Patentability dated Jun. 19, 2012 in Application No. PCT/US2010/059887.
International Preliminary Report on Patentability dated Jun. 19, 2012 in Application No. PCT/US2010/059883.
Office Action dated Jun. 25, 2012 in U.S. Appl. No. 12/640,289.
Final Office Action dated Jul. 2, 2012 in U.S. Appl. No. 12/504,828.
Advisory Action dated Jul. 10, 2012 in U.S. Appl. No. 12/820,186.
Office Action dated Jul. 18, 2012 in U.S. Appl. No. 12/820,190.
International Preliminary Report on Patentability dated Jul. 24, 2012 in Application No. PCT/US2010/059889.
Office Action dated Aug. 28, 2012 in U.S. Appl. No. 12/820,186.
Office Action dated Sep. 4, 2012 in U.S. Appl. No. 12/690,461.
Office Action dated Sep. 4, 2012 in U.S. Appl. No. 12/820,193.
Final Office Action dated Oct. 11, 2012 in U.S. Appl. No. 12/640,183.
Advisory Action dated Oct. 11, 2012 in U.S. Appl. No. 12/504,828.
Final Office Action dated Dec. 19, 2012 in U.S. Appl. No. 12/820,186.
Notice of Allowance dated Dec. 26, 2012 in U.S. Appl. No. 12/690,461.
International Preliminary Report on Patentability dated Dec. 28, 2012 in Application No. PCt/US2011/041147.
Advisory Action dated Jan. 16, 2013 in U.S. Appl. No. 12/640,183.
Office Action dated Feb. 28, 2013 in Mexican Application No. MX/a/2012/000606.
Final Office Action dated Mar. 5, 2013 in U.S. Appl. No. 12/820,193.
Office Action dated Mar. 28, 2013 in U.S. Appl. No. 12/640,183.
Advisory Action dated May 29, 2013 in U.S. Appl. No. 12/820,193.
Office Action dated Jun. 24, 2013 in U.S. Appl. No. 12/504,828.
Office Action dated Jul. 15, 2013 in U.S. Appl. No. 12/820,193.
Notice of Allowance dated Aug. 21, 2013 in U.S. Appl. No. 12/640,183.
Office Action received Sep. 5, 2013 in Mexican Application No. MX/a/2012/000606.
Final Office Action dated Sep. 30, 2013 in U.S. Appl. No. 12/640,289.
Office Action dated Oct. 2, 2013 in U.S. Appl. No. 12/820,186.
Notice of Allowance dated Oct. 7, 2013 in U.S. Appl. No. 12/690,461.
Final Office Action dated Oct. 23, 2013 in U.S. Appl. No. 12/820,190.
Notice of Allowance dated Dec. 2, 2013 in U.S. Appl. No. 12/504,828.
Office Action dated Jan. 24, 2014 in Japanese Application No. 2012-520759.
Office Action received Jan. 27, 2014 in Mexican Application No. MX/a/2012/000606.
Final Office Action dated Jan. 28, 2014 in U.S. Appl. No. 12/820,193.
Office Action dated Mar. 3, 2014 in Chinese Application No. 201080029478.7.
Notice of Allowance dated May 5, 2014 in U.S. Appl. No. 12/820,186.
Office Action dated Jul. 12, 2018 in European Application No. 10800510.9.

\* cited by examiner

TRUSTED MEDIATOR INTERACTIONS WITH MOBILE DEVICE SENSOR DATA

CROSS-REFERENCE TO RELATED APPLICATIONS

This application is a continuation of, claims priority to and the benefit of, U.S. Ser. No. 15/629,492 filed Jun. 21, 2017 and entitled "MOBILE DEVICE SENSOR DATA." The '492 application is a continuation of, claims priority to and the benefit of, U.S. Ser. No. 14/599,151 filed Jan. 16, 2015, which issued as U.S. Pat. No. 9,712,552 on Jul. 18, 2017. The '151 application is a continuation of U.S. patent application Ser. No. 14/139,840, filed on Dec. 23, 2013, which issued as U.S. Pat. No. 8,955,140 on Feb. 10, 2015. The '840 application is a continuation of U.S. patent application Ser. No. 12/640,183, filed on Dec. 17, 2009, which issued as U.S. Pat. No. 8,621,636 on Dec. 31, 2013. The present application claims a priority benefit to each of the above-mentioned applications and the disclosure of each of those applications is hereby incorporated by reference in its entirety, as if fully set forth herein.

BACKGROUND OF THE INVENTION

Field of the Invention

The present invention generally relates to information security systems, and more particularly, to systems, methods, and computer program products for collecting and reporting sensor data in a communication network based on dynamic feedback.

Related Art

With the proliferation of mobile communication devices, such as mobile telephones, financial account holders that have such devices have begun to use them to complete financial transactions. Enabling financial account holders to do so, however, poses unique security risks for financial account issuers, particularly because security capabilities and risks vary widely across different mobile communication devices and different mobile communication networks. For example, typical payment systems involve point-of-sale (POS) terminals that are usually owned and designed by either financial transaction issuers or merchants. In contrast, because mobile communication devices are manufactured by various manufacturers and can be modified by third parties, financial account issuers have less control and knowledge of the security capabilities and risks associated with them. This makes it more difficult to control the security of financial transactions that are completed using mobile communication devices. Security measures vary based on particular models of mobile communication devices, thus compounding this inherent security risk.

The risk for financial account issuers is further complicated by the mobility of mobile communication devices. Each location in which mobile communication devices can be operated potentially has a different security environment. As a result, different security measures for each location are necessary. For example, bringing a mobile communication device into a foreign country may require the mobile communication device to roam on a foreign mobile communication network, which has inherently different security risks, capabilities, and other characteristics.

Security designers perform a labor-intensive and exhaustive analysis of the risks associated with each component of a new network in an attempt to safely interface their existing security system with the new network. The existing security system is often modified to accommodate the risks associated with the new network. This process takes a substantial amount of time and thus limits the speed with which financial account issuers can enter new markets that utilize mobile-based financial transaction networks. As a consequence, they can lose market share.

In addition, security designers typically assume that all security characteristics and risks of the network components will remain static once the system is deployed. A typical security system thus utilizes a particular set of security measures deployed until the security system is taken offline and either replaced or modified. In other words, if risks of the security system change, for example, by a breach of a security measure by an attacker, a maintenance window or an outage must be realized to enable the security system to be modified to respond to a security breach, patch, or upgrade. Such a system cannot adapt dynamically to various detected feedback relating to changes impacting the security situation of the network. Typical security systems, therefore, lack the adaptability necessary to be suitable for mobile-based financial transaction systems. Moreover, the static security measures of typical security systems increase the ease with which internal and external attackers can circumvent the security measures. As payment and network systems adapt to next generation payment and communication, the attacks and exploits will also evolve into next generation criminal exploits.

Notwithstanding the above-mentioned security risks, enabling mobile transactions is still a particularly attractive means for financial account issuers to enter the markets of non-bankable countries where widespread POS infrastructure is neither available nor practical.

Given the foregoing, it would be useful to be able to continuously detect changes in network security characteristics, and adapt based on these detected changes to maintain an acceptable level of security for existing and new network connections including merchants, customers, and partners for visiting and home networks.

It also would be useful to enable business entities, such as financial account issuers, to enter new markets (e.g., the mobile-based financial transaction market) with minimal modifications to their existing security system, and to accept new risk scenarios with the ability to manage magnitude of exposure by network segment, region, issuer, partner, device, and/or account across numerous device and network types.

In addition, it would be useful to enable the characterization of currently uncharacterized (e.g., non-domestic) communication network components and/or attributes to enable adaptation to the risks to maintain an acceptable level of security.

BRIEF DESCRIPTION OF THE INVENTION

The present invention meets the above-identified needs by providing systems, methods, and computer program products for collecting and reporting sensor data in a communication network.

Trust mediator agents, which are associated with each network component, continuously detect changes in the security characteristics of each network component using sensors and feed the detected changes back to a trust mediator. The trust mediator uses the feedback from the trust mediator agents to determine whether and how to modify currently running security safeguards in order to maintain an appropriate level of security. Modifications, if any, are communicated by the trust mediator to the appropriate network component via its associated trust mediator agent for implementation. The process is recursive and thus continuously adapts to changes in network security characteristics as they arise over time to strike a balance between the probability of loss plus magnitude of loss versus acceptable risk to enable business transactions to continue without disruption at an account level and/or at a network component level.

A business entity (e.g., a financial account issuer) can integrate new communication networks having new security characteristics into their existing network without the need to perform an exhaustive and labor-intensive upfront analysis to estimate the security impact a new communication network will have on their existing network. Instead, the business entity can define rules, such as a threshold of acceptable risk, begin to communicate with the new network, and enable their existing security system to detect and adapt to the security characteristics of the new network while maintaining the acceptable risk acceptance level. Time-to-market is reduced, and the level of risk exposed to the business entity can be managed at a minimized level.

Users' expectations regarding security measures are taken into account. Thus, if a particular security measure is too inconvenient for a user, the security measure is modified or disabled to a minimal level. This balances the risk acceptance of a firm with a convenience cost representing user or account holder countermeasure choice, and provides the issuer and the account holder with firm acceptable transaction risk elasticity. Alternatively, if the security measure provides too low a security level for the user to accept the security measure, it is modified or replaced with a more rigorous security measure. The effect is to increase the propensity for user satisfaction and thus movement towards equilibrium of strategy and payoff for usage of the system based on time, location, and relevance, and results in more efficient risk models to increase market share for the business entity.

In one embodiment, a microprocessor coupled to a memory and an electronic storage device receives sensor data from sensors, and stores the sensor data for each sensor in the electronic storage device. The microprocessor also receives, via the communication network, a data reporting instruction defining a data reporting technique corresponding to the sensor data associated with one or more of the sensors. The data reporting instruction is stored in the electronic storage device, and the microprocessor transmits, to a trust mediator over the communication network, at least a portion of the sensor data based on the data reporting instruction. The trust mediator maintains an acceptable level of security for data throughout the communication network by adjusting security safeguards based on the sensor data.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION

Figure 1:
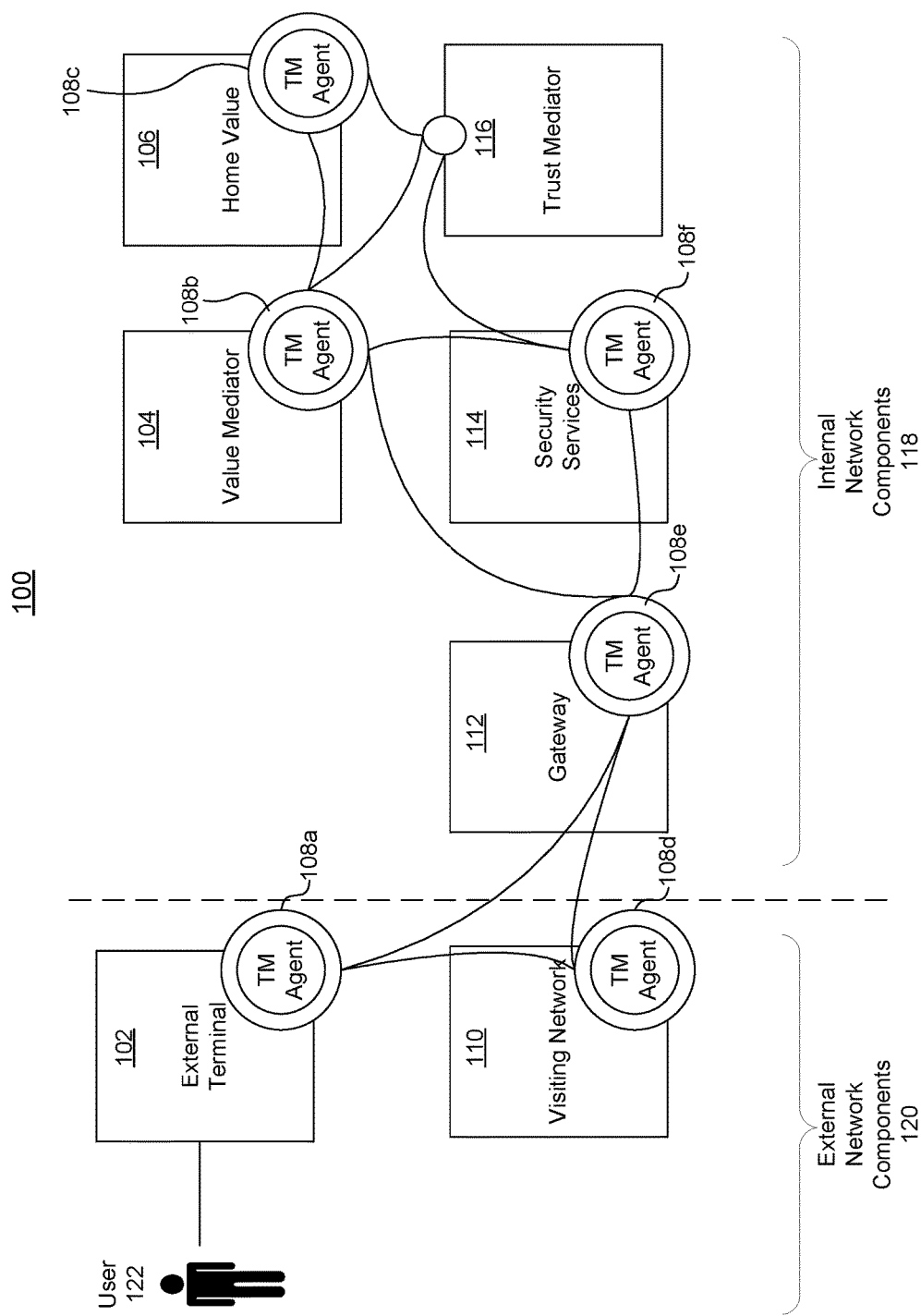
FIG. 1 is a diagram of an exemplary security system for adapting security measures of a communication network based on dynamic feedback, in accordance with an embodiment of the present invention.

The present invention is directed to systems, methods and computer program products for collecting and reporting sensor data in a communication network, which are now described in more detail herein in terms of an example mobile payment system. This is for convenience only and is not intended to limit the application of the present invention. In fact, after reading the following description, it will be apparent to one skilled in the relevant art(s) how to implement the following invention in alternative embodiments (e.g., general network security systems, mass transit security systems, home and business security systems, etc.).

The terms "user," "consumer," "account holder," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant can be a grocery store, a retail store, a travel agency, a service provider, an online merchant or the like.

A "transaction account" as used herein refers to an account associated with an open account or a closed account system. The transaction account can exist in a physical or non-physical embodiment. For example, a transaction account can be distributed in non-physical embodiments such as an account number, frequent-flyer account, telephone calling account or the like. Furthermore, a physical embodiment of a transaction account can be distributed as a financial instrument.

An "account," "account number," or "account code," as used herein, can include any device, code, number, letter, symbol, digital certificate, smart chip, digital signal, analog signal, biometric or other identifier/indicia suitably configured to allow a consumer to access, interact with or communicate with a financial transaction system. The account number can optionally be located on or associated with any financial transaction instrument (e.g., a rewards, charge, credit, debit, prepaid, telephone, embossed, smart, magnetic stripe, bar code, transponder or radio frequency card).

The terms "financial account issuer," "account issuer," and "issuer," and/or the plural forms of these terms are used interchangeably throughout herein to refer to those persons or entities that provide transaction account(s) to account holders. For example, an issuer may be a credit card issuer, a bank, or any other financial institution.

In general, transaction accounts can be used for transactions between the user and merchant through any suitable online or offline communication network, such as, for example, a wired network; a wireless network; a telephone network; an intranet; the global, public Internet; and/or the like. Additionally, the user can complete transactions with the merchant using any suitable communication device, such as a point-of-interaction device (e.g., a point-of-sale (POS) device, a personal digital assistant (PDA), a mobile telephone, a kiosk, etc.), a radio frequency enabled transaction card, and/or the like.

A financial transaction instrument (also referred to as a "payment device") can be traditional plastic transaction cards; titanium-containing, or other metal-containing, transaction cards; clear and/or translucent transaction cards; foldable or otherwise unconventionally-sized transaction cards; radio-frequency enabled transaction cards; or other types of transaction cards, such as credit, charge, debit, pre-paid, or stored-value cards; or any other like financial transaction instrument. A financial transaction instrument can also have electronic functionality provided by a network of electronic circuitry that is printed or otherwise incorporated onto or within the transaction instrument (and typically referred to as a "smart card"), or be a fob having a transponder and an RFID reader.

The term "safeguard," "security measure," "security safeguard," and/or the plural forms of these terms are used interchangeably throughout herein to refer to any process, hardware, software, algorithm, countermeasure, or the like, that increases security, confidentiality, and/or integrity of data communicated over communication networks. For example, a safeguard can be a key length, an encryption/decryption algorithm, a checksum, a hash function, an access level, a password requirement, a fingerprint requirement, or the like.

FIG. 1 is a diagram of an exemplary security system 100 for adaptively securing mobile communication device transactions in accordance with an embodiment of the present invention. As shown in FIG. 1, security system 100 includes both internal network components 118 and external network components 120. Internal network components 118 are network components that are internal to an issuer network. External network components 120 are network components that are external to the issuer network.

External network components 120 include an external terminal 102, which is any electronic communication device a consumer can use as an interface to complete a financial transaction with a merchant. Examples of types of financial transactions user 122 may request include a purchase at a point-of-sale (POS) device, a transfer of funds from an account of user 122 to that of another user, a mobile-to-mobile fund transfer, a transfer of funds between two accounts commonly owned by user 122, a request for data stored in one of internal network components 118 in association with an account of user 122, a request to modify data stored in one of internal network components 118 in association with an account of user 122, etc. For example, external terminal 102 can be a point-of-sale (POS) device, a kiosk, or a mobile communication device such as a mobile telephone, a personal computer, a POS device, a personal digital assistant (PDA), a portable computing device, a radio frequency enabled transaction card, or the like.

Another external network component 120 is a visiting network 110, which is any electronic communication network that is communicatively coupled to external terminal 102 and one or more internal network components 118. Example visiting networks 110 include a mobile telephone carrier network, an external payment network and/or service, a media network, a Rich Site Summary (RSS) feed network, a private network, a public network, a Bluetooth™ network, an automated clearing house (ACH) network, a peer-to-peer (P2P) network, or the like.

Internal network components 118 include a gateway 112, which is communicatively coupled to visiting network 110. External terminal 102 communicates with internal network components 118 through visiting network 110. Gateway 112 translates communication network protocols to enable proper communication between visiting network 110 and internal network components 118. Gateway 112 also includes any number of communication network modules depending on the characteristics of visiting network 110 and internal network components 118. For instance, gateway 112 can include a firewall, a network address resolution table, a proxy for address translation, a session border controller, etc. (all not shown).

Another internal network component 118 is a security services module 114. Security services module 114 is communicatively coupled to gateway 112, and performs security functions such as encryption, decryption, key management, and/or any other functions suitable for ensuring the security, confidentiality, and/or integrity of data communicated throughout system 100.

Another internal network component 118 is home value module 106, which includes a memory or other electronic storage device (not shown) that electronically stores information related to electronic assets owned by the issuer. For example, home value 106 can store data entries representing credit, deposits, loyalty points, reward points, media, and the like. Each data entry of home value 106 has a value-base and an associated quantitative and/or qualitative value that also are stored in the memory (not shown) and are used by trust mediator 116 in order to assess security risks associated with that particular data entry.

Internal network components 118 also include a value mediator 104, which valuates electronic assets owned by an entity other than the issuer. These assets have a value-base other than the value-bases stored in home value 106. Value mediator 104 thus enables quantification and exchange of value across different value-bases. In addition, by valuating these assets, value mediator 104 enables risk magnitude quantification associated with these assets to be computed by trust mediator 116. For example, if the value of the transaction or commerce was an asset calculated by value mediator 104, then this computed value is input to trust mediator 116 to react by changing one or more protections, countermeasures, or policies related to the asset.

Trust mediator (TM) agents 108a-108f (collectively 108) are deployed on external terminal 102, visiting network 110, gateway 112, security services module 114, value mediator 104, and home value module 106, respectively. TM agents 108 detect and assess security-related information collected from one or more sensors corresponding to each respective network component and communicate this information to trust mediator 116. The sensors measure a physical quantity, such as an electronic signal or other data, and convert it into a signal which can be read by an observer and/or by an instrument, such as one or more of the TM agents 108 or trust mediator 116. Trust mediator 116, in turn, communicates instructions to one or more of the TM agents 108 to modify implementation of security safeguards. Trust mediator 116 also assesses information received from the TM agents 108 and determines whether and/or how to modify security safeguards according to security and/or trust mediation algorithms that can be singular or a summation of plural safeguards and countermeasures interchangeable based on security goals.

Figure 2:
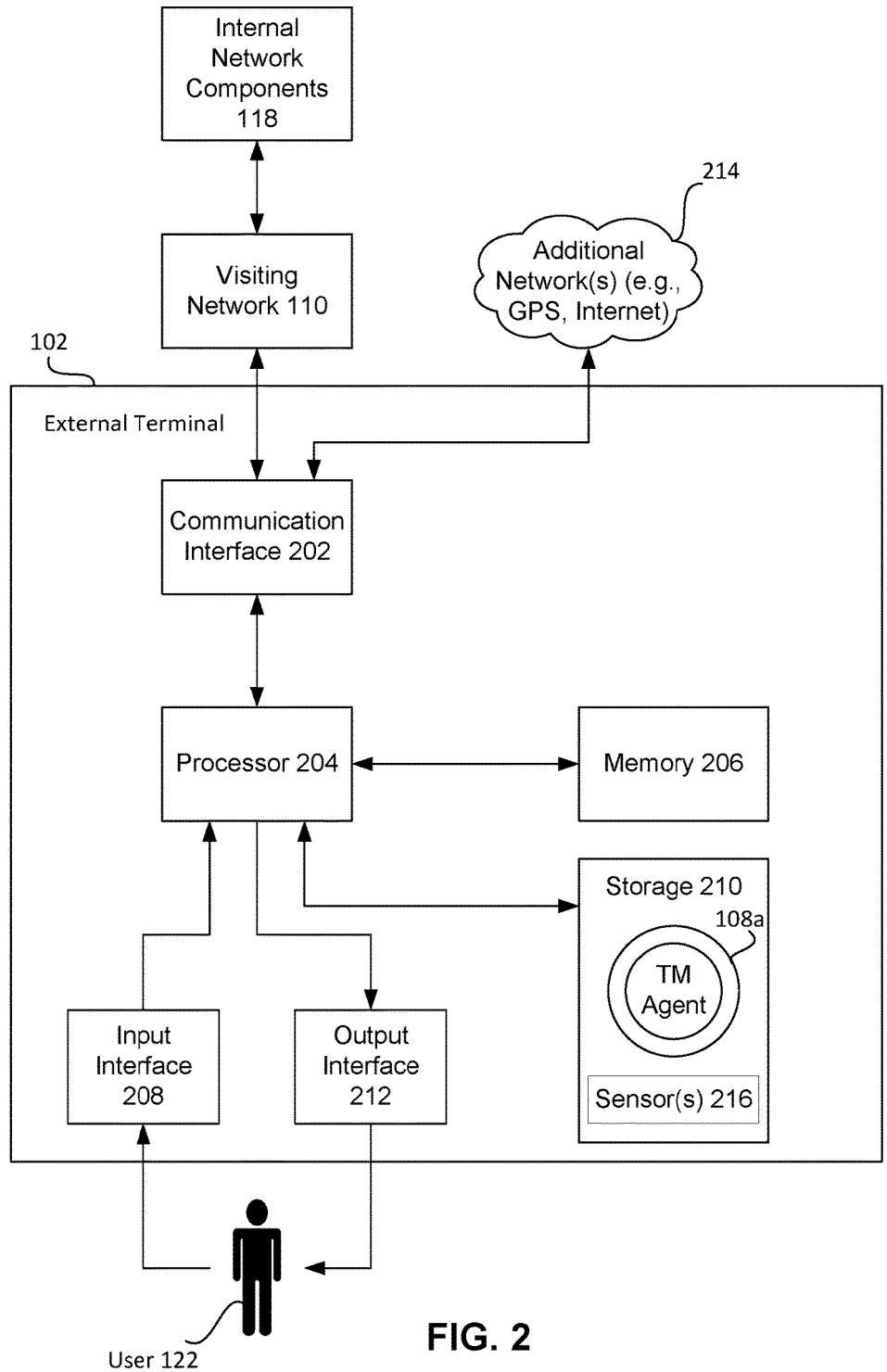
FIG. 2 is includes a more detailed diagram of an external terminal of some embodiments.

FIG. 2 includes a more detailed diagram of an external terminal 102 of some embodiments. With reference to FIGS. 1 and 2, system 200 shows that the exemplary external terminal 102 includes a processor 204, which is coupled through a communication infrastructure (not shown) to an input interface 208, an output interface 212, a communication interface 202, a memory 206, and a storage device 210.

External terminal 102 receives user input from user 122 via input interface 208. Example input interfaces 208 include a keypad, a trackball, a touch screen, a microphone, a mouse, etc. Input interface 208 forwards the received user input to processor 204 for further processing. In the example shown in FIG. 2, the user input is processed by processor 204 to carry out financial transactions, define user expectation of trust, define user expectation of convenience, etc., which are described below in further detail with reference to FIG. 3.

External terminal 102 presents output to user 122 via output interface 212. Example output interfaces 212 include a graphical display, an audio loudspeaker, a light-emitting diode (LED), etc. Output interface 212 receives output from processor 204 and communicates the output to user 122 via a user interface, such as a graphical and/or audio interface, to enable user 122 to carry out financial transactions, etc.

External terminal 102 also includes a main memory 206, such as random access memory (RAM). Main memory 206 is used by processor 204 to store data and/or instructions associated with running computer programs. External terminal 102 also includes a storage device 210, which stores data and/or instructions associated with computer programs. Storage device 210 (which is sometimes referred to as "secondary memory") may include, for example, a hard disk drive and/or a removable storage drive, representing a disk drive, a magnetic tape drive, an optical disk drive, etc. As will be appreciated, storage device 210 may include a computer-readable storage medium having stored thereon computer software and/or data.

In alternative embodiments, storage device 210 may include other similar devices for allowing computer programs or other instructions to be loaded into the external terminal 102. Such devices may include, for example, a removable storage unit and an interface, a removable memory chip such as an erasable programmable read only memory (EPROM), or programmable read only memory (PROM) and associated socket, and other removable storage units and interfaces, which allow software and data to be transferred from the removable storage unit to the external terminal 102.

In the example shown in FIG. 2, storage device 210 stores data and/or instructions corresponding to one or more sensor (s) 216 as well data and/or instructions corresponding to TM agent 108a. Processor 204 may copy portions of the instructions corresponding to sensor 216 and/or TM agent 108a from storage device 210 to main memory 206 for execution by processor 204. Each sensor 216 measures a physical quantity and converts it into sensor data that is stored as a corresponding risk variable by TM agent 108a in storage device 210. As described in further detail below with respect to FIG. 4, TM agent 108a communicates the risk variable to trust mediator 116, based on data reporting instructions received from trust mediator 116.

External terminal 102 also includes communication interface 202 to provide connectivity to a network, such as visiting network 110 and/or additional network(s) 214. As discussed below with reference to FIG. 4, visiting network 110 provides connectivity between external terminal 102 and an issuer's internal network components 118, enabling user 122 to use external terminal 102 to carry out financial transactions with an account issued by the issuer. Additional network(s) 214 may include a Global Positioning System (GPS) network, the Internet, and/or other proprietary networks.

In an embodiment where additional network(s) 214 includes a GPS network, communication interface 202 may receive data from the GPS network relating to geographic positioning of external terminal 102. Communication network 202 also enables software and data to be transferred between external terminal 102 and other external devices (not shown), such as external sensors. Examples of communication interface 202 may include a modem, a network interface such as an Ethernet card, a communications port, a Personal Computer Memory Card International Association (PCMCIA) slot and card, etc. Software and data transferred via communication interface 202 are in the form of signals which may be electronic, electromagnetic, optical, or other signals capable of being received by communication interface 202. These signals are provided to and/or from communication interface 202 via a communications path, such as a channel. This channel carries signals and may be implemented by using wire, cable, fiber optics, a telephone line, a cellular link, an RF link, and/or other suitable communications channels.

Figure 3:
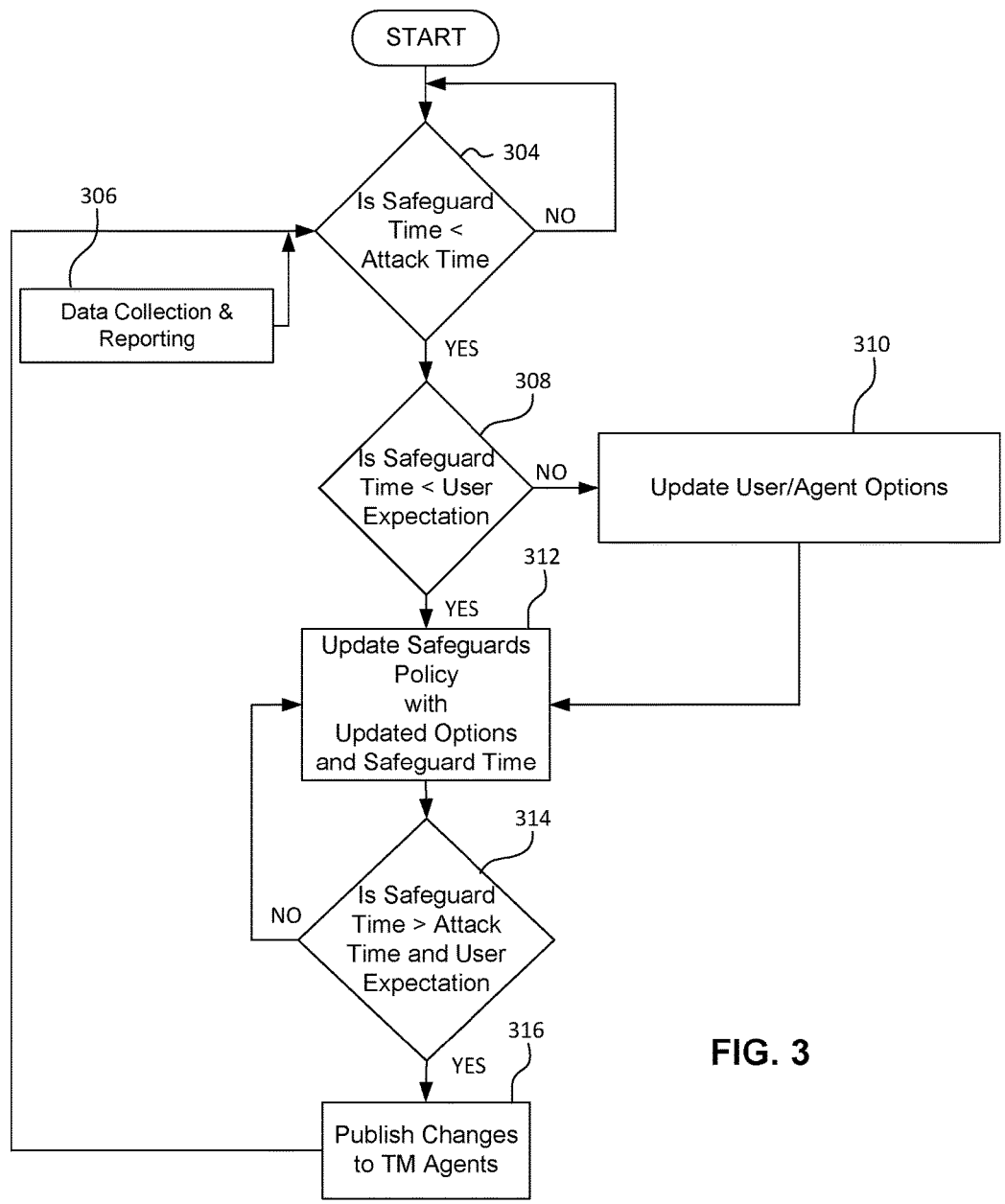
FIG. 3 is a flowchart illustrating an exemplary process for adapting security measures of a communication network based on dynamic feedback in accordance with an embodiment of the present invention.

FIG. 3 is a flowchart illustrating an exemplary process 300 for adapting security measures of a communication network based on dynamic feedback in accordance with an embodiment of the present invention. Referring to FIGS. 1 and 3, variables used throughout process 300 are initialized with seed values. These variables are stored in a memory or other electronic storage device (not shown) located in one or more of internal network components 118. Example variables include values, attributes, and weighting factors for electronic assets, a user expectation of trust, a user expectation of convenience, an attack time, a safeguard time, a transaction location profile for user 122, a transaction time profile for user 122, etc. As process 300 progresses, the initial values of the variables are updated based on feedback processes and probes which are described in further detail below.

A broad spectrum of risks are managed by dynamically measuring various risk factors using TM agents 108a-108f that are fed data from their associated sensors (not shown) as well as security-related information retrieved from other information sources, such as risk engines, risk networks, etc. Each sensor measures a physical quantity and converts it into a signal that is stored as a risk variable by the TM agents 108a-108f, respectively, and is forwarded to the trust mediator 116, as necessary. Sensors and sensor data are described in more detail below with reference to FIG. 4.

At block 306, one or more of TM agents 108a-108f collects data from one or more corresponding sensors and communicates the data in the form of risk variables to trust mediator 116. As described in further detail below with reference to FIG. 4, TM agents 108a-108f report data to trust mediator 116 by implementing specific data reporting techniques specified by trust mediator 116.

Other information communicated by TM agents 108a-108f to trust mediator 116 includes data relating to safeguards currently deployed throughout system 100. Trust mediator 116 uses this data to compute safeguard time (which may also be referred to as protection time). In particular, trust mediator 116 computes safeguard time as the total amount of secure time (time during which system 100 is rendered secure) provided by all the security safeguards that are currently in place in system 100 from end to end.

Once trust mediator 116 computes safeguard time, the computed value of safeguard time replaces the initialized value of safeguard time discussed above.

As described above, TM agents 108a-108f communicate to trust mediator 116 data relating to current security threats present throughout system 100. Trust mediator 116 uses this data to compute attack time for the current threats. Attack time is an amount of time it would take for a detected threat to circumvent the currently running safeguards. For example, if a particular encryption algorithm is used as the current safeguard, then the attack time is the risk factor, in time, predicted for a computer with the average computing power to crack the protection mechanisms, which can include the encryption algorithm, pairing, and/or authentication, using brute force or cryptanalysis methods. Once trust mediator 116 computes the attack time, the computed value of attack time replaces the initialized value of attack time discussed above.

User 122 inputs data relating to user expectation of trust into processor 204 via input interface 208. TM agent 108a receives the data relating to user expectation of trust from processor 204 and communicates this data to trust mediator 116 via communication interface 202. Trust mediator 116 uses this data to compute a user expectation of trust for user 122. User expectation of trust represents the level of protection required by user 122 in connection with particular transactions, and can be based on the type of transaction requested by user 122 via external terminal 102. For example, user 122 may require a higher level of security (and hence a higher safeguard time) for transactions over a certain amount of money. Once trust mediator 116 computes user expectation of trust, the computed value of user expectation of trust replaces the initialized value of user expectation of trust discussed above.

TM agent 108a also receives user input from external terminal 102 relating to user expectation of convenience and communicates this information to trust mediator 116. Trust mediator 116 uses this information to compute a user expectation of convenience for user 122. User expectation of convenience represents the maximum inconvenience that user 122 will accept in association with safeguards. User expectation of convenience also is based on the type of transaction requested by user 122 via external terminal 102. For example, user 122 may be unwilling to accept the inconvenience associated with requiring user 122 to submit to a biometric identification process, such as an iris scan, for a transaction of $5. Once trust mediator 116 computes user expectation of convenience, the computed value of user expectation of convenience replaces the initialized value of user expectation of convenience discussed above.

TM agents 108a-108f communicate data to trust mediator 116 relating to security threats of internal network components 118 and external network components 120. Trust mediator 116 stores this data in a memory (not shown) for use in quantifying security risk and determining the appropriate safeguards to counter the risk.

At block 304, trust mediator 116 compares the computed value of safeguard time to the computed value of attack time to determine whether the safeguard time provided by the currently running safeguards is less than the attack time. If trust mediator 116 determines that the safeguard time is greater than or equal to the attack time, then system 100 is considered secure, in other words, there is no time period during which the system 100 is exposed to threats. In this case, the procedure continuously repeats block 304 using updated information, if any, communicated at block 306 from TM agents 108 to trust mediator 116. In this way, the procedure is recursive and is able to continuously and dynamically adapt to changes in security characteristics.

If trust mediator 116 determines, however, that safeguard time is less than attack time, then the procedure continues to block 308. At block 308, trust mediator 116 determines whether the current safeguard time satisfies the computed user expectation of trust and the computed user expectation of convenience. This determination includes comparing the computed safeguard time against both the computed user expectation of trust and the computed user expectation of convenience. Safeguard time fails to satisfy the user expectation of trust if the safeguard time provided by the currently running safeguards is less than the minimum security level user 122 will accept for the transaction (e.g., only requiring a mother's maiden name for a $10,000 transaction). Safeguard time also fails to satisfy the user expectation of convenience if the inconvenience associated with the currently deployed safeguards exceeds the maximum inconvenience user 122 will accept for the transaction (e.g., requiring an iris scan for a $5 transaction). If the trust mediator 116 determines that the safeguard satisfies both user expectation of trust and user expectation of convenience then the procedure progresses to block 310.

At block 310, user 122 uses external terminal 102 to input information relating to user expectation of trust, user expectation of convenience, and/or safeguards, as desired. Trust mediator 116 stores and uses this information to compute an equilibrium point that optimally balances user expectation of trust and user expectation of convenience for user 122 based on transaction characteristics. For example, if the stored user expectation data indicates that user 122 typically requires more rigorous safeguards (higher safeguard time) for transactions involving amounts above $1,000 than for those below $1,000, trust mediator 116 uses more rigorous safeguards for transactions above $1,000 and less rigorous safeguards for transactions below $1,000. This increases user's 122 satisfaction with system 100 because both trust and convenience are optimized and personalized for individual users 122.

After block 308 or block 310, as the case may be, the procedure progresses to block 312. If trust mediator 116 determines at block 308 that safeguard time satisfies user expectation of trust and user expectation of convenience, then at block 312 trust mediator 116 enables, disables, and/or modifies one or more safeguards according to the information input by user 122 at block 310, if any.

Alternatively, if trust mediator 116 determines at block 308 that safeguard time fails to satisfy user expectation of trust and/or user expectation of convenience, then at block 312 trust mediator 116 enables, disables, and/or modifies safeguards according to one or more trust mediation algorithm(s).

Example safeguard modifications include increasing a key length, changing an encryption algorithm, changing an authentication method, etc. Safeguard modifications help thwart attackers' attempts to circumvent safeguards. For example, changing an encryption key and/or an encryption algorithm during run-time increases the difficulty of an attacker successfully circumventing the encryption. Additional safeguard modifications associated with particular sensors are described below with reference to FIG. 4.

One variable that is used by trust mediator 116 in determining whether and/or how to modify safeguards for a transaction is the risk associated with transaction data (electronic assets) stored in and/or communicated throughout system 100. Trust mediator 116 computes risk as the product of a value (magnitude) of specific transaction data and the probability that the specific transaction data will be compromised.

The value of the specific transaction data is determined in one of two ways depending on the value-base of the specific transaction data. If the transaction data is based on a value-base stored in home value 106 (e.g., U.S. dollars, euros, etc.), then home value 106 computes the value of the specific transaction data based on that value-base. Home value 106 computes the value of the specific transaction data and communicates the value to trust mediator 116 for computing the risk associated with the specific transaction data.

If the specific transaction data is based on a value-base that is not stored in home value 106 (e.g., an unknown currency), then value mediator 104 computes the value of the specific transaction data using a valuation formula, which could be supported by one or multiple value transitions to reach like terms and comparable mediation weights. Value mediator 104 enables trust mediator 116 to assess risk for values not based on value-bases stored in home value 106, and enables transfer of value across value-bases. Inputs to the valuation formula include attributes of the specific transaction data as well as weighting factors corresponding to each of the attributes. Examples of the attributes of specific transaction data include: an owner of the specific transaction data, a time or location of the associated transaction, a currency of the specific transaction data, and the like.

As mentioned above, if user 122 has not yet used system 100 to complete any transactions, then initialized values of the attributes and the weighting factors are used in the valuation formula. Over time, as user 122 completes transactions using system 100, the values of the attributes and the weighing factors are updated in the memory (not shown) and are used in the valuation and risk formula.

If the values of the attributes and weighting values converge over time, then trust mediator 116 uses the converged values of the attributes of a user's 122 transactions to assess risk of future transactions. These converged values are used by trust mediator 116 in computing the probability that specific transaction data will be compromised. For example, if the converged values for user 122 indicate that user 122 typically enters transactions during a particular time and/or at a particular geographical location, then trust mediator 116 increases the probability that specific transaction data will be compromised for any transaction from user 122 that originates at a different time and/or location than those indicated by the converged data. Conversely, trust mediator 116 decreases the probability that specific transaction data will be compromised for any transaction from user 122 that originates at approximately the time and/or location indicated by the converged data. Thus, exposure to risk is minimized through continuous dynamic improvement and convenience equilibrium for user 122 is maximized. Value mediator 104 transmits the computed value of the specific transaction data to trust mediator 116 for computing the risk associated with the specific transaction data.

As mentioned above, trust mediator 116 collects data from TM agents 108 using various data reporting techniques, such as polling-based reporting. Trust mediator 116 can also use polling-based reporting to periodically poll TM agents 108a-108f and request data relating to detection time, which is the time required for TM agents 108a-108f to detect threats. Trust mediator 116 also keeps track of the reaction time, which is the time taken for system 100 to react to previously detected threats by implementing adjusted safeguards. If trust mediator 116 determines that safeguard time is less than the product of the detection time and the reaction time, then trust mediator 116 increases the rate at which it polls TM agents 108a-108f to decrease the detection time.

From block 312, the procedure progresses to block 314. At block 314, trust mediator 116 determines whether modifications to the safeguards determined at block 312 satisfy the attack time, the user expectation of trust, and the user expectation of convenience. If the trust mediator 116 determines that the safeguards fail to satisfy the attack time, the user expectation of trust, and/or the user expectation of convenience, then the procedure repeats block 312 to further modify the safeguards as needed. If trust mediator 116 determines that the safeguards satisfy the attack time, the user expectation of trust, and the user expectation of convenience, then the procedure progresses to block 316.

If more than one safeguard (e.g., protection method) is selected for implementation by trust mediator 116, then the total protection includes a sum of the multiple selected protection methods. In other words, the protection is not one-dimensional, but instead is multi-dimensional. That is, multiple layers or dimensions of protection are provided, which further reduces risk exposure.

In one embodiment, each particular multi-dimensional combination of protection methods selected represents a specific protection signature. Similarly, each particular multi-dimensional combination of security-related information (e.g., threats, exploits, attacks, etc.) communicated to trust mediator 116 at block 306 represents a specific attack signature. Rules are defined that match specific protection signatures to specific attack signatures. In this way, when the detected attack signature changes, trust mediator 116 changes the protection signature to react accordingly. Thus, multi-dimensional protection is provided as a response to multi-dimensional attacks.

In another embodiment, the rules do not simply authorize or deny a transaction solely in response to detecting any particular one-dimensional security threat. Instead, the rules involve a summation of the current multi-dimensional protection and attack signatures, and a balance of the risk of loss against opportunity cost. In particular, trust mediator 116 computes a risk of loss associated with permitting a transaction to continue, based on the summation of the current multi-dimensional protection and attack signatures. Trust mediator 116 then computes an opportunity cost associated with denying the transaction, based on the current value of exposure (e.g., the transaction amount).

The risk of loss is balanced against the opportunity cost using a table of rules. The table of rules defines, for each value of exposure, a threshold of a maximally permissible risk of loss. In response to a change in attack signature, trust mediator 116 can dynamically change the protection signature (e.g., by using a stronger combination of protection methods), but is limited to selecting a protection signature that results in a risk of loss within the maximally permissible risk of loss for the current value of exposure. If, for the current attack signature and value of exposure, no protection signature exists in the protection matrix that can keep the risk of loss within the maximally permissible risk of loss, then trust mediator 116 may deny the transaction. The risk of loss is thus balanced against the opportunity cost so as to minimize exposure to risk while also minimizing interruptions to commerce.

In one respect, denying a legitimate $10 transaction may be considered the same loss of value as a theft of $10. By implementing the balancing rules, not only are losses due to theft minimized, but losses due to denials of legitimate transactions also are minimized.

Trust mediator 116 can also include time as a factor in computing the risk of loss and the opportunity cost. For instance, in computing the risk of loss, trust mediator 116 computes a period of time during which the current protection signature will remain effective against the current attack signature.

In addition, rather than enforcing the thresholds of maximally permissible risks of loss for each individual transaction, the thresholds can be enforced for averages of multiple transactions completed over time. For instance, trust mediator 116 can compute a running average of the risks of loss for multiple transactions. If multiple transactions having a risk of loss appreciably lower than the maximally permissible risk of loss are accumulated, then trust mediator 116 may permit a transaction having a risk of loss higher than the maximally permissible risk of loss, so long as the running average of the risk of loss does not exceed the maximally permissible risk of loss. In this way, an acceptable average risk of loss is maintained, while permitting the completion of transactions that may have otherwise been deemed too risky.

At block 316, the trust mediator 116 communicates the safeguard modifications (e.g., protection method(s)) to one or more of the TM agents 108a-108f. For instance, the trust mediator 116 communicates changes in safeguards relating to security services to security services module 114 to implement the new security services and safeguards (e.g., a different encryption/decryption algorithm). In this case, the safeguard modification is sent to at least two network components, namely, the component that performs the encrypting of data and the component that performs the decrypting of data. In one embodiment security services module 114 implements security applications based on the Diameter protocol and/or other authentication, authorization and accounting (or AAA) protocols.

From block 316, the procedure repeats block 304 with new information communicated from TM agents 108 at block 306, if any exists. In this way, the procedure is recursive and thus is able to continuously and dynamically adapt to changes in the security situation as they arise over time and/or the particular location of external terminal 102. User 122 can thus use external terminal 102 to complete financial transactions using system 100 while experiencing an adaptive level of security that is both effective and convenient. Moreover, issuers can enable consumers to use their financial transaction accounts over their mobile telephones to complete transactions in various geographical locations, while maintaining an adaptive level of security that is effective and not over burdensome for user 122.

Figure 4:
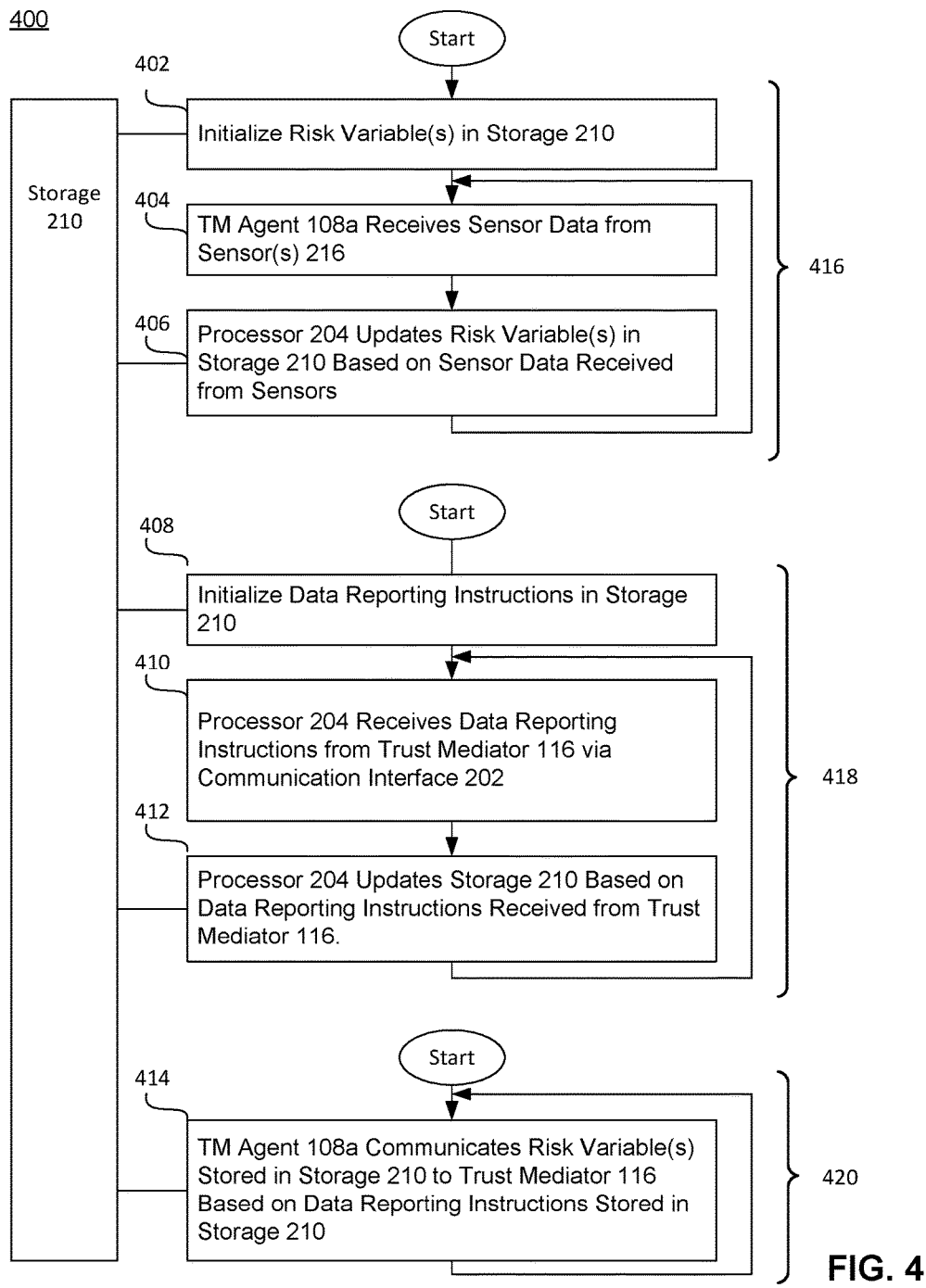
FIG. 4 is a flowchart diagram illustrating an exemplary process for collecting data from sensors and reporting the data to a trust mediator.

FIG. 4 is a flowchart diagram showing an exemplary procedure 400 for collecting data from sensors and reporting the data to trust mediator 116. As shown in FIG. 4, process 400 includes three parallel sub-processes 416, 418, and 420, which may operate synchronously or asynchronously with respect to each other. It should be understood that although FIG. 4 shows process 400 being implemented in connection with TM agent 108a and external terminal 102, this is by way of example, and is not limiting. In fact, process 400 may also be implemented by one or more of TM agents 108b-108f in association with their respective network components. Similarly, the sensors, sensor data, and sensing techniques described below with reference to TM agent 108a may also be implemented by one or more of TM agents 108b-108f.

With reference to FIGS. 1, 2, and 4, sub-process 416 shows an exemplary procedure for collecting sensor data from sensor(s) 216 and updating risk variables in storage 210. Sensor data, in this context, may also include security-related information retrieved by trust mediator 116 and/or one or more of TM agents 108a-108f from risk engines, risk networks, and other information sources, as discussed above. Initially, processor 204 retrieves computer program instructions corresponding to TM agent 108a from storage 210, and loads the instructions into main memory 206 for execution. At block 402, processor 204 initializes risk variable(s) stored in storage 210 based on the computer program instructions corresponding to TM agent 108a.

At block 404, processor 204 receives sensor data and/or other security-related information from sensor(s) 216. Sensor data is used by trust mediator 116 as input into one or more risk models, to compute risk related to a particular transaction. One exemplary risk model defines risk as the product of a magnitude of loss and a probability of loss associated with a particular transaction. As described above with reference to FIG. 3, the magnitude of loss is computed by trust mediator 116 based on data received in association with value mediator 104 and home value 106. The probability of loss is computed based on, among other things, sensor data. That is, sensor data is used by trust mediator 116 in computing the probability that a specific transaction will be a loss, and this computation impacts the computation of the overall risk for the transaction. By using sensor data to compute an overall risk for the transaction, trust mediator 116 can adjust a risk policy by modifying safeguards as necessary to maintain an acceptable level of risk.

Systems 100 and 200 may contain numerous types of sensors that sense corresponding types of physical quantities and/or data to provide trust mediator 116 with as complete a set of inputs as possible for computing risk. Regardless of the type of sensor, each sensor provides sensor data to one or more of TM agents 108a-108f, and the sensor data is converted into a signal that is stored in a corresponding risk variable, which in turn is communicated to trust mediator 116. At block 406, processor 204 updates risk variable(s) stored in storage 210 based on sensor data received from sensor(s) 216. Sub-process 416 is then repeated so as to maintain up-to-date risk variable(s) in storage 210.

In some cases, a sensor may be unable to provide up-to-date data to one or more of TM agents 108a-108f because, for example, the sensor is malfunctioning, user 122 has not input the type of data that the sensor is configured to sense, the sensor is not applicable to the type of transaction requested by user 122, or the like. In the event that a sensor malfunctions and fails to report data to one or more of TM agents 108a-108f, the corresponding TM agent 108a-108f transmits to trust mediator 116 data indicating that the sensor is malfunctioning. For example, this data can be included in a header field associated with a risk variable. If a sensor is not malfunctioning but is unable to provide up-to-date information for another reason, the corresponding TM agent 108a-108f transmits to trust mediator 116 data indicating that the sensor data is not up-to-date. This data can be included in an additional header field associated with a data packet carrying a risk variable. The corresponding TM agent 108a-108f can determine whether sensor data from a particular sensor is up-to-date based on a predetermined time threshold such that data that was collected at a time that exceeds the predetermined time threshold is no longer considered up-to-date. In this way, trust mediator 116 implements a security policy by collecting data to the extent possible from sensors and their associated TM agents 108a-108f.

One example type of sensor is a tactile sensor that converts pressure, electrical, and/or electromagnetic phenomena, such as vibrations, into a signal that is stored in a corresponding risk variable. An exemplary tactile sensor is a biometric sensor that senses and converts a physical characteristic of a human, such as user 122, into a value that is stored in another risk variable. The biometric sensor converts a fingerprint of user 122 into data that is used to authenticate the identity of user 122. In addition, one or more tactile sensors can be incorporated into, and/or coupled onto, external terminal 102 to periodically sense data relating to the geometry of how user 122 holds and/or moves external terminal 102. The geometric data is used by TM agent 108a and/or trust mediator 116 to compute and store a geometric signature corresponding to user 122. TM agent 108a and/or trust mediator 116 compares the periodically sensed geometric data to the stored geometric signature to authenticate the identity of user 122.

Another type of sensor is a speed sensor that converts speed to a value that is stored in another risk variable. The speed sensor stores, in a risk variable, speed data indicating a speed at which external terminal 102 is traveling. Trust mediator 116 uses the speed data to determine the likelihood of whether successive transactions originating from distinct locations are fraudulent or are due to the traveling of user 122.

Another type of sensor is an accelerometer that senses and converts orientation, vibration, and/or shock into a value that is stored in another risk variable. The accelerometer is incorporated into, and/or coupled onto, external terminal 102 to periodically sense data relating to the acceleration of external terminal 102 due to repositioning of external terminal 102 by user 122. The acceleration data is used by TM agent 108a and/or trust mediator 116 to compute and store an acceleration signature corresponding to user 122. TM agent 108a and/or trust mediator 116 compares the periodically sensed acceleration data to the stored acceleration signature to authenticate the identity of user 122.

Still another type of sensor is a software sensor, such as sensor(s) 216 shown in FIG. 2, that senses changes in usage of external terminal 102 based on, e.g., data inputted into external terminal 102, data outputted by external terminal 102, etc., and stores the result in another risk variable. Sensor 216 is described in further detail below, with reference to FIGS. 1 and 2.

As discussed above, in addition to sensor data, security-related information is collected and aggregated by trust mediator 116 from risk engines, risk networks, and other available information sources. Risk engines and risk networks retrieve security-related information from other sources and provide the information to users to inform them of various ongoing security risks. Examples of risk engines and/or risk networks include RSA™ Risk Engine, McAfee™ Threat Center, Symantec™ Threatcon, and ESET™ Virus Radar. Examples of other information collected by trust mediator 116 include statistics from the U.S. Federal Emergency Management Agency and statistics from the U.S. Department of Homeland Security. Security-related information from these types of information sources are collected and aggregated across multiple providers, and then translated by using application programming interfaces (APIs) integrated into trust mediator 116 and/or one or more of TM agents 108a-108f to manage a dynamic risk policy. Trust mediator 116 and/or one or more of TM agents 108a-108f also use one or more web crawlers to browse the Internet to retrieve security-related information.

As discussed above, trust mediator 116 and/or one or more of TM agents 108a-108f aggregate information of multiple distinct types. For example, financial transaction-related information is aggregated with information unrelated to financial transactions. If only transaction-related information were monitored, then a security system may determine that a cardholder shopping in multiple geographically distant locations in a relatively small period of time is fraudulent, by assuming that the cardholder could not have traveled so far so quickly. Trust mediator 116, however, by aggregating the transaction-related data along with data retrieved from, e.g., the cardholder's mobile phone records indicating calls originating from locations corresponding to the transaction locations, can determine that the transactions are less likely to be fraudulent.

Upon collecting and aggregating security-related information from risk engines, risk networks, etc., trust mediator 116 and/or one or more of TM agents 108a-108f filter the security-related information according to one or more filter criteria. The security-related information is then translated according to one or more translation and/or valuation algorithms to obtain like terms and comparable mediation weights. The security-related information is then funneled into one or more statistical models to compute risk score(s) corresponding to specific transactions and/or to specific protection mechanisms, and the like. Trust mediator 116 manages the dynamic risk policy by making specific security decisions, such as enabling a specific protection mechanism, based on these computed risk score(s).

As those skilled in the art will recognize, other types of sensors and/or information sources can be used and still be within the scope of the invention.

As shown in FIG. 2, external terminal 102 may communicate with a GPS network via communication interface 202. In this case, sensor 216 collects geographic position data (also referred to as location data) of external terminal 102 from the GPS network, and stores it in a corresponding risk variable, which is communicated to trust mediator 116 according to data reporting instructions, as described below. Trust mediator 116 uses location data in various ways to compute the probability that certain transaction(s) will be a loss (fraudulent).

In one aspect, trust mediator 116 stores time data and location data received in connection with multiple transactions for a particular external terminal 102. Trust mediator 116 analyzes the stored time data and location data by comparing them to the time data and location data received in connection with a new transaction to determine the probability that the new transaction is fraudulent. For instance, trust mediator 116 may determine that there is a high probability that the new transaction is fraudulent if the location data received for the new transaction is vastly different than that of the stored location data of a previous transaction, and the time between the two transactions is too minimal to reasonably believe that user 122 has traveled between the two locations.

Trust mediator 116 can also enable user 122 to register one or more geographic regions as safe regions for external terminal 102, such that the trust mediator 116 can implement less strict security policies for transactions carried out in these regions using external terminal 102. For example, user 122 may register his or her state of primary residence as a safe region. In a similar aspect, trust mediator 116 enables user 122 to register one or more geographic regions as dangerous regions for external terminal 102, such that the trust mediator 116 can implement more strict security policies for transactions carried out in these regions using external terminal 102. For example, user 122 may register a state in which rampant identity theft has been reported to be a dangerous region. Movement slightly inside a dangerous region does not necessarily cause a transaction to be denied. Instead, in conjunction with other criteria, such as a quantity of fraudulent transactions that have been reported as having originated near the location of external terminal 102, trust mediator 116 computes a new risk factor. If the new risk factor exceeds a predetermined threshold, trust mediator 116 denies the transaction.

In addition, trust mediator 116 can store data representing the quantity of fraudulent transactions that have occurred, or that have been reported, based on location (e.g., any delineated geographic region such as a country, a state, a territory, a custom-delineated geographic region, etc.). Trust mediator 116 analyzes location data received in connection with a new transaction, determines a region to which the location corresponds, and determines the quantity of fraudulent transactions that have occurred/been reported in that region. Trust mediator 116 implements a more strict security policy for transactions carried out using external terminal 102 in a region of high fraudulent transactions than those carried out in a region of low fraudulent transactions. Trust mediator 116 may store multiple predetermined risk tiers that each correspond to a specific range of quantities of reported fraudulent transactions. Trust mediator 116 may then implement predefined security policies for transactions based on the specific risk tier to which the transactions correspond.

Also, sensor(s) 216 can sense data inputted into external terminal 102 to determine a type of transaction requested by user 122. Examples of types of transactions user 122 may request include a purchase at a point-of-sale (POS) device, a transfer of funds from an account of user 122 to that of another user, a mobile-to-mobile fund transfer, a transfer of funds between two accounts commonly owned by user 122, a request for data stored in one of internal network components 118 in association with an account of user 122, a request to modify data stored in one of internal network components 118 in association with an account of user 122, and the like. If user 122 initiates a new transaction, trust mediator 116 may increase or lower the level of the implemented security policy, by modifying the appropriate security safeguards based on the type of transaction indicated by the corresponding risk variable.

Additionally, sensor(s) 216 can sense payload data inputted into external terminal 102 to determine which portions of messages are encrypted, and if so, which specific encryption algorithm was used to encrypt each encrypted message portion. Trust mediator 116 receives this data in the form of risk variables from TM agent 108a, and uses this data, along with similar data received from one or more of TM agents 108b-108f, to identify the vulnerable data paths of the system and determine their impact on the probability that a certain transaction will be a loss. Data paths between certain network terminals may have different inherent vulnerabilities than others. Similarly, certain encryption methods may have different inherent vulnerabilities than others. A certain block of data may, for example, be encrypted for transmission from external terminal 102 to visiting network 110, and then be decrypted for transmission between visiting network 110 and gateway 112. Trust mediator 116 uses this payload data in determining how to modify safeguards to implement an acceptable security policy. For example, trust mediator 116 may communicate instructions to one or more of TM agents 108a-108f to encrypt data according to specific algorithms, which may be different from data path to data path. That is, one encryption algorithm may be used between external terminal 102 and visiting network 110, while a different encryption algorithm is used between visiting network 110 and gateway 112. Alternatively, one encryption algorithm can be used for multiple data paths, while different keys are used for each data path.

Sensor(s) 216 also can sense pairing data inputted into external terminal 102 to enable trust mediator 116 to perform a pairing of external terminal 102 and user 122. Trust mediator 116 uses pairing data to verify that user 122 is authorized to use external terminal 102, and to ensure that user 122 is not, for example, a thief who has stolen external terminal 102 and is attempting to carry out fraudulent transactions. Trust mediator 116 begins to perform a pairing process by presenting, via output interface 212, a request for user 122 to input pairing data. Once trust mediator 116 receives the pairing data, the pairing data is compared with other data stored in trust mediator 116 in connection with external terminal 102 and an associated financial account to determine the probability that a certain transaction will be fraudulent. Example data that trust mediator 116 may request from user 122 includes an amount of the last successful transaction, a location of the last successful transaction, personal identification information, etc. If trust mediator 116 determines that the response(s) to the request(s) are unsatisfactory, trust mediator 116 may notify user 122 that an e-mail message including a code will be sent to the e-mail address on record for user 122, and that user 122 must input this code into external terminal 102 to continue the transaction.

Trust mediator 116 can adjust the pairing requests made to a specific user 122 based on time data and location data received from external terminal 102. For instance, if trust mediator 116 determines that there is a high probability that a new transaction is fraudulent because the location data received for the new transaction is vastly different than that of the stored location data of the previous transaction, and the time between the two transactions is too minimal to reasonably believe that user 122 has traveled between the two locations, then trust mediator 116 may increase the security level of the pairing requests made to user 122.

Sensor(s) 216 can sense data inputted into external terminal 102 to determine whether the data has been fraudulently modified at some point throughout the data path. For example, trust mediator 116 can instruct external terminal 102 and/or other terminals to use a hash function to compute hashes associated with data at specific points throughout systems 100 and 200. Sensor(s) 216 then perform their own hash computation on specific data to ensure that the hash matches the data. Trust mediator 116 may use different hash functions at different points throughout systems 100 and 200. Alternatively, trust mediator 116 may alternate between several hash functions at a predetermined time interval. This sensing technique can also be used by sensor(s) 216 to detect a covert channel, which are sometimes implemented by modifying lower-order bits in digital messages to carry a covert message. For example, sensor(s) 216 may also use this technique to determine whether specific data was inputted via input interface 208, such as a keyboard, or via a covert channel. Trust mediator 116 uses this technique and the associated sensor data and/or risk variables to compute the probability that a particular transaction will be fraudulent.

Sensor(s) 216 also can sense native application data stored in storage device 210 in connection with a native application to determine whether the native application has been signed with a digital signature. This technique can be used to ensure the authenticity of the native application, to ensure that the native application has not been forged and/or tampered with, and to provide non-repudiation of messages. Trust mediator 116 uses the data relating to native application data signatures to compute the probability that a particular transaction will be a fraudulent.

Additionally, sensor(s) 216 can sense data communicated via communication interface 202 to determine whether there is more than one active communication session per user 122. Sensor(s) 216 monitors the establishment and the tearing down of communication sessions, to ensure that only one communication session is open at a given time. Trust mediator 116 uses this technique to detect eavesdropping, covert channels, etc., and, if necessary, to modify the safeguards as appropriate.

Sensor(s) 216 can sense data communicated via communication interface 202 so that TM agent 108a and/or trust mediator 116 can perform traffic analysis on the data. In particular, sensor(s) 216 intercepts data and examines it to determine patterns which may be used to deduce information associated with the data. Trust mediator 116 uses this sensor data and/or risk variables to compute the probability that a particular transaction will be fraudulent. For example, trust mediator 116 may compare patterns determined for data communicated via communication interface 202 to patterns known to be associated with malicious software.

In addition, sensor(s) 216 can sense attempts made via communication interface 202 to access honeypot data stored in storage device 210 so that TM agent 108a and/or trust mediator 116 can monitor and/or record information relating to the attackers of systems 100 and 200. The honeypot data has no production value, is separated from legitimate data stored in storage device 210, and may be accessed via a dedicated open proxy. Any attempts to access the honeypot data, therefore, can be assumed to be malicious acts of attackers. Trust mediator 116 uses risk variables relating to the honeypot data to compute the probability that transaction(s) carried out with a particular external terminal 102 will be fraudulent.

Sensor(s) 216 can sense password attempt data inputted by user 122 into external terminal 102 to log password attempts. Trust mediator 116 uses the password attempt data and/or the associated risk variables to compute the probability that a particular transaction will be fraudulent. For example, if the number of password attempts exceeds a certain predefined threshold, trust mediator 116 may prevent external terminal 102 from being used to carry out transactions until user 122 contacts an account issuer and authenticates his or her identity.

Also, sensor(s) 216 can sense data stored in storage device 210 to create a brokered trust between multiple local parties via a communication protocol, such as Bluetooth™, near-field communication (NFC), and/or any other suitable wired or wireless communication protocol. Once two or more users 122 are authenticated, TM agent 108a and/or trust mediator 116 uses location data of the corresponding external terminals 102 collected by sensor(s) 216 from GPS network 214 to determine the probability that the two or more users 122 are in relatively close proximity to each other.

If it is determined that the two or more users 122 are in relatively close proximity to each other, TM agent 108a and/or trust mediator 116 can establish a trust between the corresponding two external terminals 102 by, for example, providing each external terminal 102 with a token, such as a key. The token is used to establish confidentiality and integrity between the members of the trust. The current members of the trust can also vote to broker other external terminals 102 into a trust chain. For example, a trust can be brokered between a first merchant, at which user 122 has completed a previous transaction, and a second merchant, at which user 122 is attempting to complete another transaction. If the POS device of the second merchant has lost connection with their payment network, the transaction can be completed using the payment network of the first merchant, and the two merchants can settle the transaction between each other once the second merchant has reestablished connection with their payment network.

Sub-process 418 shows an exemplary procedure for receiving and updating data reporting instructions from trust mediator 116. At block 408, processor 204 initializes variables that correspond to data reporting instructions in storage 210. The initialization is performed based on computer program instructions included within TM agent 108a. The data reporting instructions define data reporting techniques to be used by TM agent 108a to report data to trust mediator 116. In particular, the data reporting instructions define, for each risk variable and/or cluster of risk variables, an indication of whether the risk variable and/or cluster should be reported to trust mediator 116, and if so, the specific data reporting technique to be used. Different data reporting instructions may be used for individual risk variables and/or clusters of risk variables.

Data reporting instructions also define one or more clusters of risk variables. As discussed above, each external and internal network component 120 and 118 has one or more associated sensors feeding data to the respective TM agent 108a-108f, and the data is stored in a corresponding risk variable. The one or more risk variables associated with a particular network component can be grouped into clusters to derive one or more risk spaces for the network component. Different clusters and/or risk spaces can be derived by using different risk variables and/or different data reporting techniques based on various data reporting factors. For example, the cluster of risk variables for a particular network component can be dynamically changed by one or more of TM agents 108a-108f or by trust mediator 116 based on the instant condition (e.g., environment, location, speed, etc.).

As mentioned above, trust mediator 116 receives data from TM agents 108a-108f using various data reporting techniques (e.g., event-based reporting, polling-based reporting, cluster-based reporting, and/or sampling rate-based reporting, etc.). Where event-based reporting is implemented, TM agents 108a-108f detect events, and in response to any of TM agents 108a-108f detecting an event, the corresponding TM agent 108a-108f communicates updated data related to the event to trust mediator 116. Example events that TM agents 108a-108f can detect include the connecting of external terminal 102 to visiting network 110, the receipt of a request by external terminal 102 connected to visiting network 110 to complete a financial transaction, the receipt of a request to associate a new external terminal 102 with a financial account of user 122, a change in a condition such as the time or location of external terminal 102, etc. Other events detectable by TM agents 108a-108f include the receipt of specific sensor data from sensors. The other TM agents 108, either in parallel or in response to a detection made by TM agents 108a and 108b, can detect events such as the presence of a security threat associated with any of the internal and external network components 118 and 120, the safeguards currently in place for internal and external network components 118 and 120, information input by user 122 via external terminal 102 regarding expectation of safeguards, etc.

Where polling-based reporting is implemented, trust mediator 116 periodically polls one or more of TM agents 108a-108f for updated data, at a rate determined by trust mediator 116 to be appropriate. For example, trust mediator 116 may poll TM agent 108a for data as to the location of external terminal 102 requesting multiple transactions. If data from TM agent 108a indicates a random shopping pattern because external terminal 102 is moving rapidly across different external network components 120 (e.g., because user 122 is on a moving train), trust mediator 116 can signal the other TM agents 108b-108f about this activity and poll more frequently.

Sampling rate-based reporting can be implemented. Data for each risk space is collected at a predetermined sampling rate from the sensors in the cluster by the respective TM agent 108a-108f. Sampling rates can be modified based on the instant condition, and/or based on security goals (e.g., goals regarding protection time, detection time, and reaction time, which are further described below). TM agents 108 communicate the data for each risk space to trust mediator 116 at a rate corresponding to the sampling rate.

In addition, data for each risk space can be communicated by one or more of TM agents 108a-108f to trust mediator 116 as a running summation of measurements collected over a predetermined integration time period (also referred to as running summation-based reporting). The integration time period can also be modified based on various data collection and/or reporting factors. For example, if the sample rate is set to 2 sample per second, and trust mediator 116 sets a 10 second integration period for a particular TM agent 108a-108f, then trust mediator 116 will receive summations of every consecutive 20 samples from the corresponding TM agent 108a-108f.

Data for each risk space also can be periodically communicated to trust mediator 116 in bursts of data (also referred to as block measurement). The intervals between the block measurements can also be modified based on data collection and/or reporting factors. TM agents 108 and/or trust mediator 116 can normalize the data that produces each risk space by computing a weighted and/or a non-weighted sum of the data from the sensors in the cluster.

At block 410, processor 204 receives data reporting instructions from trust mediator 116 via communication interface 202. At block 412, processor 204 stores the data reporting instructions in storage 210 in association with TM agent 108a, overwriting the initialized data reporting instructions with those received from trust mediator 116. Sub-process 418 is then repeated so as to maintain up-to-date data reporting instructions in storage 210. In this way, the data reporting techniques and/or use of the various risk variable data points and clusters are determined dynamically by trust mediator 116. For example, trust mediator 116 can change the clusters of risk variables for each network component, and/or change the above-mentioned data reporting techniques and/or rates, based on detected risks, goals (e.g., protection time, detection time, and reaction time), and/or other dynamic factors (e.g., data communicated to trust mediator 116 from one or more of TM agents 108a-108f). This provides system 100 with a greater adaptability and versatility when compared to typical security system network agents, which deny or grant access to network resources based on the current protection mechanisms. TM agents 108a-108f, use the sensors to detect any risk factors that impact a risk profile for each network component, and in response to the sensing, can not only deny or grant access based on the current protection mechanisms, but can also assist in changing the protection mechanisms so that access and commerce can continue. In this way, process 400 is dynamic in nature, as opposed to typical network security processes, which are static in nature.

Sub-process 420 shows an exemplary procedure for communicating risk variables to trust mediator 116. At block 414, TM agent 108a communicates risk variable(s) stored in storage 210 to trust mediator 116 based on the data reporting instructions stored in storage 210. In this manner, risk variable(s) are continuously updated based on sensor data, and are communicated to trust mediator 116 in a manner controlled by trust mediator 116. This enables trust mediator 116 to manage a risk policy, as described in further detail above with respect to FIG. 3.

The present invention (e.g., systems 100, 200, processes 300, 400, or any part(s) or function(s) thereof) can be implemented using hardware, software or a combination thereof and can be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 5:
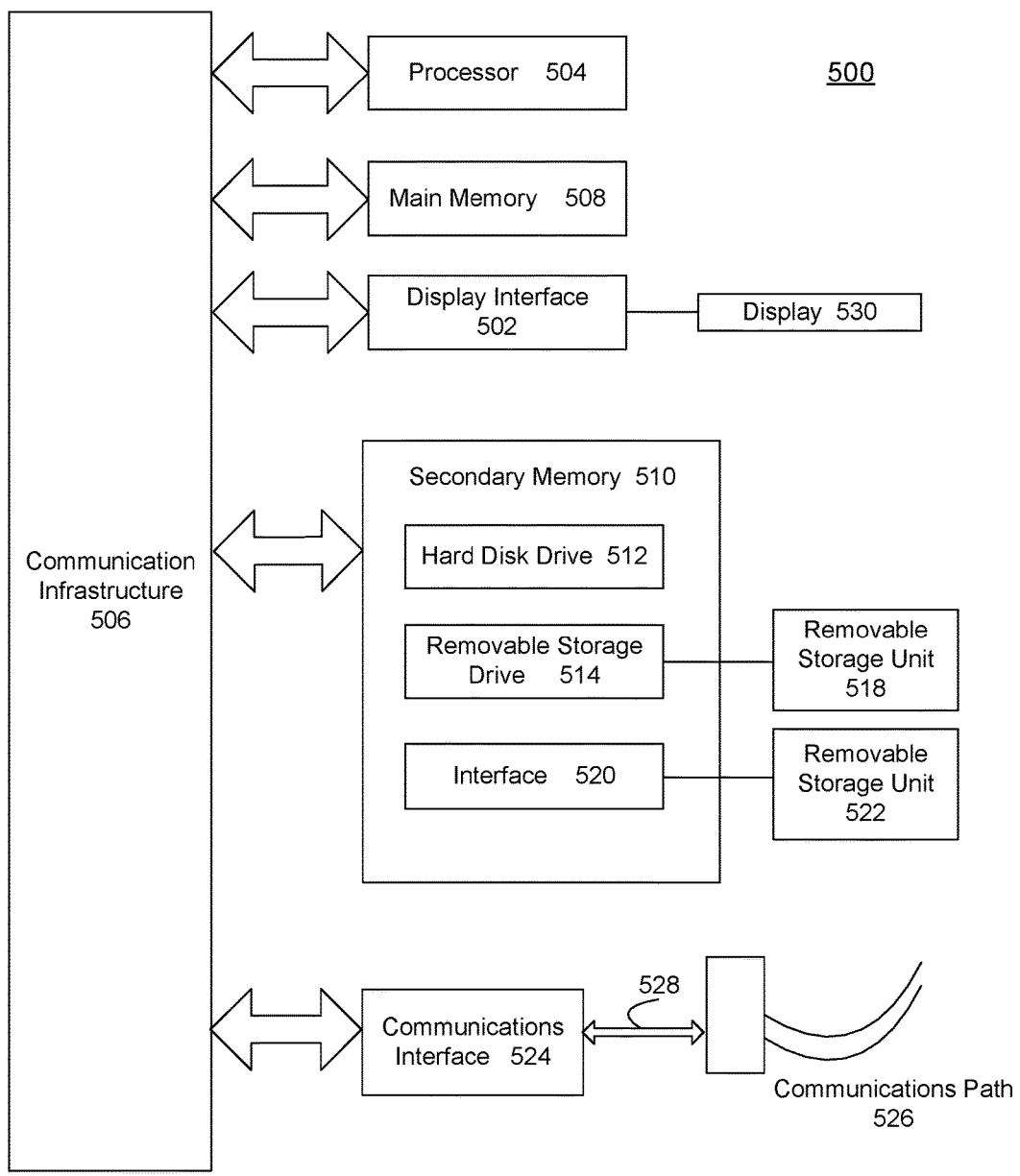
FIG. 5 is a block diagram of an exemplary computer system useful for implementing the present invention.

In fact, in one embodiment, the invention is directed toward one or more computer systems capable of carrying out the functionality described herein. An example of a computer system 500 is shown in FIG. 5.

Computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 can include other similar devices for allowing computer programs or other instructions to be loaded into computer system 500. Such devices can include, for example, a removable storage unit 522 and an interface 520. Examples of such can include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 can also include a communications interface 524. Communications interface 524 allows software and data to be transferred between computer system 500 and external devices. Examples of communications interface 524 can include a modem, a network interface (such as an Ethernet card), a communications port, a Personal Computer Memory Card International Association (PCMCIA) slot and card, etc. Software and data transferred via communications interface 524 are in the form of signals 528 which can be electronic, electromagnetic, optical or other signals capable of being received by communications interface 524. These signals 528 are provided to communications interface 524 via a communications path (e.g., channel) 526. This channel 526 carries signals 528 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 514, a hard disk installed in hard disk drive 512, and/or signals 528. These computer program products provide software to computer system 500. The invention is directed to such computer program products.

Computer programs (also referred to as computer control logic) are stored in main memory 508 and/or secondary memory 510. Computer programs can also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software can be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
    receiving, by a mediator, first sensor data from a first sensor on a mobile device;
    transmitting, by the mediator, data associated with a second sensor on the mobile device,
    wherein the data associated with the second sensor includes risk data associated with the first sensor,
    wherein the second sensor is not the first sensor, and
    wherein the data associated with the second sensor includes a data reporting instruction that is based at least in part on the risk data associated with the first sensor; and
    receiving, by the mediator, second sensor data from the second sensor.

2. The method of claim 1, wherein the risk data is based on the first sensor data.

3. The method of claim 1, wherein the data associated with the second sensor identifies the second sensor on the mobile device.

4. The method of claim 1, wherein the data associated with the second sensor includes a data reporting technique.

5. The method of claim 1, wherein the second sensor data received by the mediator is sent based on a data reporting technique.

6. The method of claim 1, wherein the data associated with the second sensor includes a data reporting technique that is an event-based reporting technique by which the second sensor data is transmitted to the mediator in response to detecting an event.

7. The method of claim 6, wherein the event includes a change in a location of the mobile device.

8. The method of claim 1, wherein the data associated with the second sensor includes a data reporting technique that is a sampling-rate-based reporting technique by which the second sensor data is transmitted to the mediator at a predetermined sampling rate.

9. The method of claim 1, wherein the second sensor is a biometric sensor.

10. The method of claim 1, wherein the second sensor data is used to authenticate an identity of a user of the mobile device.

11. The method of claim 1, wherein the second sensor data includes geographic position data that the second sensor collects from a global positioning system network and that is associated with a position of the mobile device.

12. The method of claim 1, wherein the second sensor is one of a cluster of sensors identified by the data reporting instruction.

13. The method of claim 1, wherein the data associated with the second sensor includes a data reporting technique that is one of a plurality of data reporting techniques identified by the data reporting instruction.

14. A system comprising:
a processor associated with a mediator; and
a tangible, non-transitory memory configured to communicate with the processor,
the tangible, non-transitory memory having instructions stored thereon that, in response to execution by the processor, cause the processor to perform operations comprising:
receiving, by the mediator, first sensor data from a first sensor on a mobile device;
transmitting, by the mediator, data associated with a second sensor on the mobile device,
wherein the data associated with the second sensor includes risk data associated with the first sensor,
wherein the second sensor is not the first sensor, and
wherein the data associated with the second sensor includes a data reporting instruction that is based at least in part on the risk data associated with the first sensor; and
receiving, by the mediator, second sensor data from the second sensor.

15. The system of claim 14, wherein the risk data is based on the first sensor data.

16. The system of claim 14, wherein the data associated with the second sensor identifies the second sensor on the mobile device.

17. The system of claim 14, wherein the data associated with the second sensor includes a data reporting technique.

18. The system of claim 14, wherein the data associated with the second sensor includes a data reporting technique that is an event-based reporting technique by which the second sensor data is transmitted to the mediator in response to detecting an event.

19. A non-transitory computer-readable medium having stored thereon sequences of instructions, the sequences of instructions including instructions, which, when executed by a mediator, cause the mediator to perform operations comprising:
receiving, by the mediator, first sensor data from a first sensor on a mobile device;
transmitting, by the mediator, data associated with a second sensor on the mobile device,
wherein the data associated with the second sensor includes risk data associated with the first sensor,
wherein the second sensor is not the first sensor, and
wherein the data associated with the second sensor includes a data reporting instruction that is based at least in part on the risk data associated with the first sensor; and
receiving, by the mediator, second sensor data from the second sensor.

* * * * *